US008064556B2

(12) United States Patent
Subrahmanya et al.

(10) Patent No.: US 8,064,556 B2
(45) Date of Patent: Nov. 22, 2011

(54) FRACTIONALLY-SPACED EQUALIZERS FOR SPREAD SPECTRUM WIRELESS COMMUNICATION

(75) Inventors: Parvathanathan Subrahmanya, Sunnyvale, CA (US); Inyup Kang, San Diego, CA (US); Jia Fei, San Diego, CA (US); Rajesh Sundaresan, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 863 days.

(21) Appl. No.: 11/502,178

(22) Filed: Aug. 9, 2006

(65) Prior Publication Data

US 2007/0127557 A1 Jun. 7, 2007

Related U.S. Application Data

(60) Provisional application No. 60/717,785, filed on Sep. 15, 2005.

(51) Int. Cl.
*H04B 1/10* (2006.01)
(52) U.S. Cl. ........ 375/350; 375/148; 375/234; 375/347; 375/349; 708/323
(58) Field of Classification Search .............. 375/130, 375/140–153, 229, 230, 232, 234, 316, 346, 375/347–350; 370/100, 200, 300, 322–323; 708/100, 200, 300, 322–323
See application file for complete search history.

(56) References Cited

U.S. PATENT DOCUMENTS

| 5,598,428 | A | | 1/1997 | Sato |
| 5,852,630 | A | * | 12/1998 | Langberg et al. ............. 375/219 |
| 6,175,588 | B1 | | 1/2001 | Visotsky et al. |
| 6,775,260 | B1 | | 8/2004 | Dabak et al. |
| 6,816,542 | B1 | | 11/2004 | Komatsu |
| 6,956,893 | B2 | | 10/2005 | Frank et al. |
| 7,324,583 | B2 | | 1/2008 | Hooli et al. |
| 7,483,480 | B2 | | 1/2009 | Guo et al. |

(Continued)

FOREIGN PATENT DOCUMENTS

JP 7170243 A 7/1995

(Continued)

OTHER PUBLICATIONS

Dabak A G et al.; "Equalization and multi-user detection for space time block coding based transmit diversity (STTD) in frequency selective channels"; Vehicular Technology Conference 2000; Sep. 24, 2000; pp. 1, 2, 8, 11-14, 19, 22-26; XP010525439; IEEE; Piscataway, NJ, USA.

(Continued)

*Primary Examiner* — David C. Payne
*Assistant Examiner* — James M Perez
(74) *Attorney, Agent, or Firm* — Kenyon Jenckes; Sayed H. Beladi

(57) ABSTRACT

This disclosure describes equalization techniques for spread spectrum wireless communication. The techniques may involve estimating a channel impulse response, estimating channel variance, and selecting filter coefficients for an equalizer based on the estimated channel impulse response and the estimated channel variance. Moreover, in accordance with this disclosure, the channel variance estimation involves estimation of two or more co-variances for different received samples. Importantly, the equalizer is "fractionally spaced," which means that the equalizer defines fractional filtering coefficients (filter taps), unlike conventional equalizers that presume that filter coefficients are defined at integer chip spacing. The techniques can allow the equalizer to account for antenna diversity, such as receive diversity, transmit diversity, or possibly both.

25 Claims, 23 Drawing Sheets

U.S. PATENT DOCUMENTS

| | | | |
|---|---|---|---|
| 2003/0035469 A1* | 2/2003 | Frank et al. | 375/150 |
| 2004/0032848 A1* | 2/2004 | Papasakellariou | 370/342 |
| 2004/0136444 A1 | 7/2004 | Massicotte et al. | |
| 2005/0180493 A1* | 8/2005 | Hooli et al. | 375/148 |
| 2005/0195886 A1* | 9/2005 | Lampinen et al. | 375/144 |
| 2006/0109897 A1* | 5/2006 | Guo et al. | 375/232 |

FOREIGN PATENT DOCUMENTS

| | | |
|---|---|---|
| JP | 11266232 A | 9/1999 |
| JP | 2000315966 A | 11/2000 |
| JP | 2001016136 A | 1/2001 |
| JP | 2004501541 T | 1/2004 |
| JP | 2008505577 T | 2/2008 |
| WO | WO2004064298 A2 | 7/2004 |
| WO | WO2005004338 A2 | 1/2005 |
| WO | WO2005081482 A1 | 9/2005 |

OTHER PUBLICATIONS

International Search Report and Written Opinion—PCT/US2006/036137 International Search Authority—European Patent Office—Feb. 9, 2007.

Translation of Office Action in Japan application 2008-531385 dated Feb. 22, 2011.

* cited by examiner

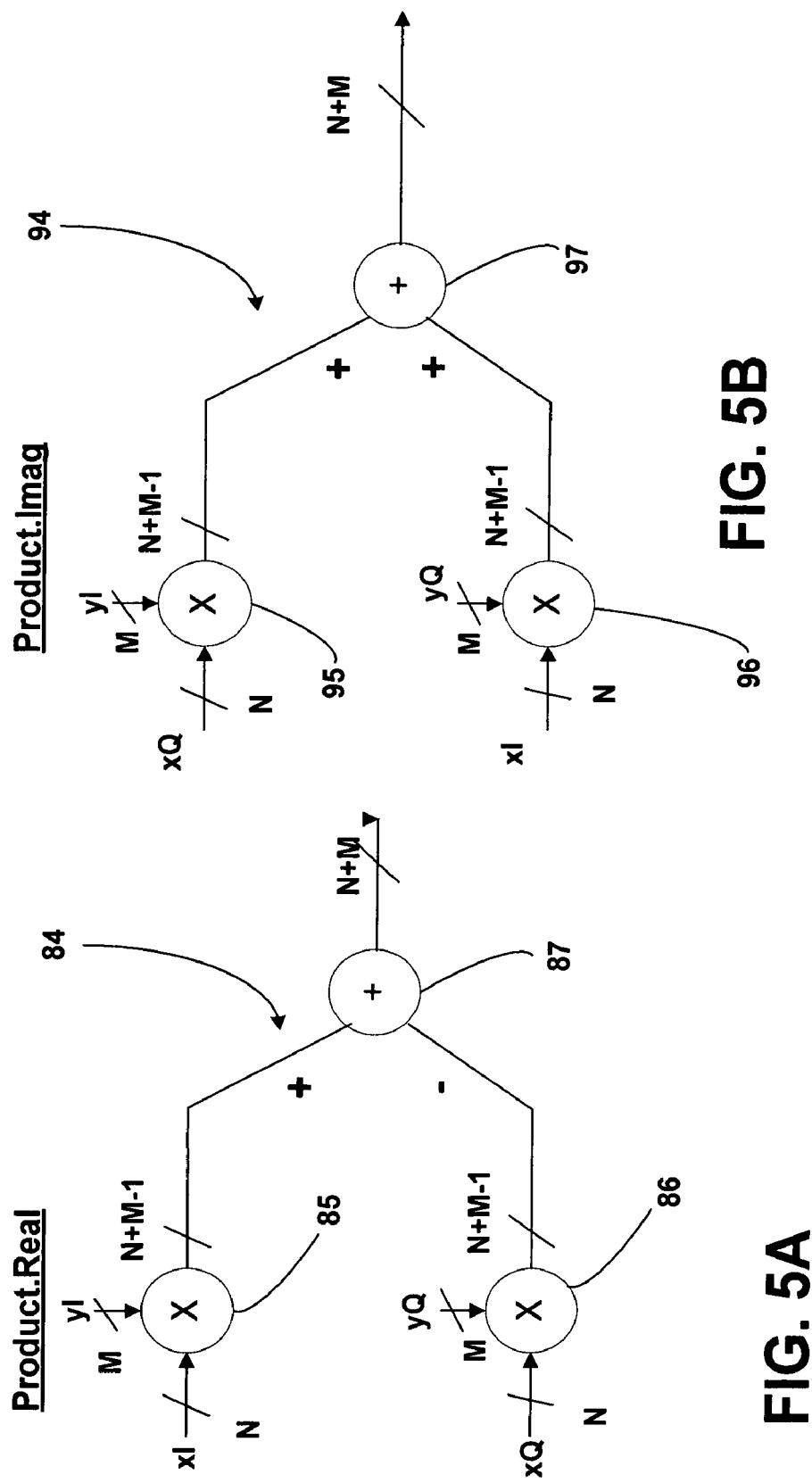

FRACTIONALLY-SPACED EQUALIZERS FOR SPREAD SPECTRUM WIRELESS COMMUNICATION

CLAIM OF PRIORITY UNDER 35 U.S.C. §119

The present Application for Patent claims priority to Provisional Application No. 60/717,785 entitled FRACTIONALLY-SPACED EQUALIZERS FOR SPREAD SPECTRUM WIRELESS COMMUNICATION, filed on Sep. 15, 2005, assigned to the assignee hereof, and hereby expressly incorporated by reference herein in its entirety.

FIELD

Background

A number of spread spectrum wireless communication techniques have been developed. For example, one common spread spectrum technique used in wireless communication is code division multiple access (CDMA) signal modulation. In CDMA signal modulation, multiple communications can be simultaneously transmitted by several sending devices over a common spread spectrum radio-frequency (RF) channel. Different receiving devices can extract the different signals from the spread spectrum RF channel using CDMA codes.

For CDMA signal modulation, each sending device utilizes unique orthogonal codes to spread each of the bits of information into a stream of binary units referred to as "chips." The chips are typically converted to an analog baseband signal, which can then be wirelessly transmitted, e.g., by modulation of the baseband signal on a carrier waveform and possibly upconversion to a transmit frequency. In conventional CDMA spreading techniques, the chips are typically generated using orthogonal "Walsh codes," and pseudo-noise (PN) codes. Other spreading techniques may use orthogonal variable spreading factor (OVSF) codes to facilitate the spreading of bits into chips.

The receive device receives the carrier waveform, which includes the transmitted chips, but also includes channel noise, e.g., from other transmitting devices or non-CDMA transmitters. The receive device downconverts the the received signal to a baseband frequency, extracts the baseband signal from the carrier waveform and converts the baseband signal to digital samples that represent the chips. The receive device then uses the known codes to extract the information bits from the chips. For example, the receive device may implement despreading and decovering techniques in order to despread the chips into the bits that comprise the encoded information. Demodulation techniques are then used to extract encoded information from the bits.

In order to deal with multi-path phenomena, CDMA receiver architecture commonly implements what is referred to as a "RAKE" receiver. A RAKE receiver can be viewed as a receiver that includes a plurality of "fingers" that extract the same signal at a number of different time delays. The transmitted signal, for example, may follow multiple paths to the receive device, and the different paths can introduce different time delays. Moreover, the different paths of a multi-path signal create noise relative to the other paths of the multi-path signal. By defining RAKE fingers at different time delays, a RAKE receiver can extract multiple instances of the same signal and select the strongest path for demodulation, or combine multiple paths to define a signal for demodulation.

In order to deal with multi-path noise and other system noise, equalization techniques have been developed. An equalizer is typically implemented at the receive device in order to filter system noise from a received signal. The equalizer is essentially a variable and adaptive filter that filters received signals in order to remove undesirable channel noise. The filtering that occurs at the equalizer typically changes over time, as channel noise changes. In addition, equalizers may play an integral role in the demodulation of received signals.

One type of equalization design that has been used for CDMA communication is a zero forcing equalizer. A zero forcing equalizer inverts the expected channel noise to remove the channel response associated with the sending device. In particular, a zero forcing equalizer may define adaptive filtering according to:

1/(the frequency response of the channel).

This approach can adequately account for noise and interference that result from the multi-path phenomenon, but does not adequately account for system noise from other devices (such as base stations) that communicate over the same channel. For this reason, zero forcing equalization techniques can be ineffective, particularly when the channel has very low gain. In such cases, system noise from other base stations can actually be amplified by the zero forcing equalizer, which is highly undesirable.

Another type of equalizer that has been used in CDMA receivers is referred to as a minimum mean square error (MMSE) equalizer. Like zero forcing equalizers, an MMSE equalizer inverts the channel to remove the channel response associated with the sending base station. However, unlike zero forcing equalizers, an MMSE equalizer also takes channel variance into account, in order to reduce or avoid undesirable amplification of the noise from other sources that communicate over the wireless channel.

MMSE equalizers typically estimate a channel impulse response and estimate a channel variance. MMSE equalizers then choose filter coefficients (filter taps) for equalization based on the estimated channel impulse response and channel variance. Conventional MMSE equalizers typically presume that filter coefficients are integer multiples of the time delays of the RAKE receiver. The time delays are defined in chip intervals, and thus, the filter coefficients in conventional MMSE equalizers are defined in integer numbers of chips.

SUMMARY

In general, this disclosure describes equalization techniques for spread spectrum wireless communication. The techniques may involve estimating a channel impulse response, estimating channel variance, and selecting filter coefficients for an equalizer based on the estimated channel impulse response and the estimated channel variance. In accordance with this disclosure, the channel variance estimation involves estimation of two or more co-variances for different received samples.

Notably, the equalizer is "fractionally spaced," which means that the equalizer defines fractional filtering coefficients (filter taps), unlike conventional equalizers that presume that filtering coefficients are defined at integer chip spacing. The techniques can also allow the equalizer to account for antenna diversity, such as receive diversity, transmit diversity, or possibly both.

In one embodiment, this disclosure describes a method of equalization in a spread spectrum wireless communication system comprising estimating a channel impulse response, estimating channel variance by computing two or more co-variances for different received samples, and selecting filter coefficients for an equalizer based on the estimated channel impulse response and the estimated channel variance.

In another embodiment, this disclosure describes a method of equalization for spread spectrum wireless communication comprising selecting filtering coefficients for two or more equalization filters based on an estimated channel impulse response and an estimated channel variance, and combining output of the two or more equalization filters based on based on antenna diversity.

In another embodiment, this disclosure describes a spread spectrum wireless communication device comprising a receiver that receives a wireless signal, and an equalizer that estimates a channel impulse response, estimate channel variance by computing two or more co-variances for different received samples of the signal, and selects filter coefficients for the equalizer based on the estimated channel impulse response and the estimated channel variance.

In another embodiment, this disclosure describes a method of equalization for spread spectrum wireless communication comprising selecting filtering coefficients for two or more equalization filters based on an estimated channel impulse response and an estimated channel variance, and combining output of the two or more equalization filters based on antenna diversity.

The techniques described herein may be implemented in hardware, software, firmware, or any combination thereof. If implemented in software, the techniques may be embodied in a computer readable medium comprising program code that when executed in a spread spectrum wireless communication device cause the device to perform equalization according to one or more of the techniques described herein.

Additional details of these and other embodiments are set forth in the accompanying drawings and the description below. Other features, objects and advantages will become apparent from the description and drawings, and from the claims.

BRIEF DESCRIPTION OF DRAWINGS

FIGS. 5A and 5B are block diagrams respectively illustrating hardware that can be used to implement dot cross techniques for equalization.

DETAILED DESCRIPTION

In general, this disclosure describes equalization techniques for spread spectrum wireless communication. The described equalization techniques can improve equalization filtering relative to conventional minimum mean square error (MMSE) equalization techniques. The techniques involve estimating a channel impulse response, estimating channel variance and selecting filter coefficients for an equalizer based on the estimated channel impulse response and the estimated channel variance.

In accordance with the teaching of this disclosure, the equalizer is "fractionally spaced," which means that the equalizer defines fractional filtering coefficients (filter taps). Such a fractionally spaced equalizer contrasts with conventional equalizers that presume that filter coefficients are integer multiples of the time delays of a multi-path signal. In particular, conventional MMSE equalization techniques define filter coefficients with spacing that corresponds to an integer number of chips.

In order to compute channel variance for fractionally spaced equalization, two or more co-variances may be needed from different received samples. For example, co-variances can be determined for odd and even samples of the received signal. Filter coefficients for the equalizer can then be defined based on the estimated channel impulse response and the co-variances determined for the odd and even samples.

The techniques described herein can allow the equalizer to account for antenna diversity, such as receive diversity, transmit diversity, or possibly both. Antenna diversity refers to wireless communication in which the transmitting or receiving device implements multiple antennas for the transmission or reception of wireless signals. Transmit diversity involves signal transmission from multiple transmit antennas. Receive diversity involves reception of signals using multiple receive antennas.

Figure 1:
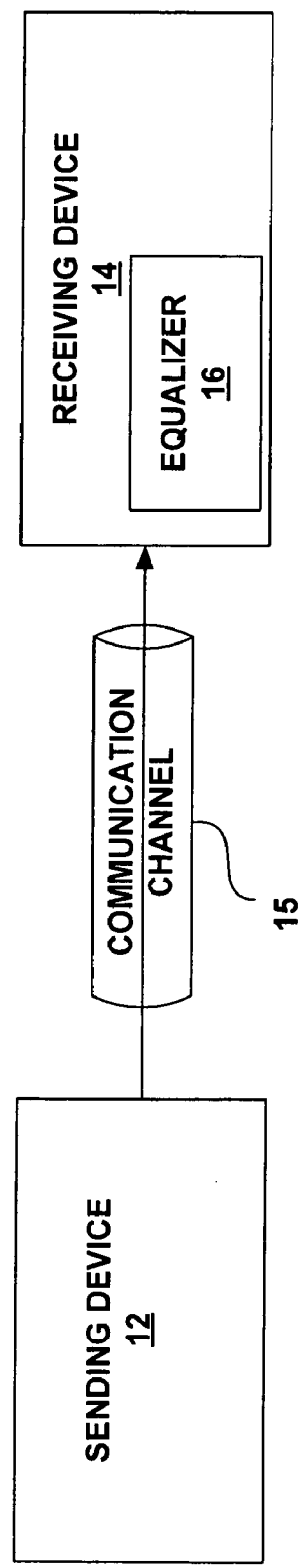
FIG. 1 is a block diagram illustrating a wireless communication system including a receive device that implements equalization techniques as described herein.

FIG. 1 is a block diagram illustrating a wireless communication system 10 including a sending device 12 that sends spread spectrum wireless communication to receive device 14 over a communication channel 15. Sending device 12 may comprise a base station and receive device 14 may comprises a mobile handset. Alternatively, sending device 12 may comprise the mobile handset and receive device may comprises a base station. In any case, receive device 14 includes an equalizer 16 that performs equalization techniques as described herein.

For example, as outlined below, equalizer 16 is fractionally spaced. Thus, equalizer 16 defines fractional filtering coefficients (filter taps). Equalizer 16 may determine two or more co-variances from different received samples in order to compute channel variance. The co-variances can be determined for odd and even samples of the received signal. Filter coefficients for equalizer 16 can then be defined based on the estimated channel impulse response and the co-variances determined for the odd and even samples.

Figure 2:
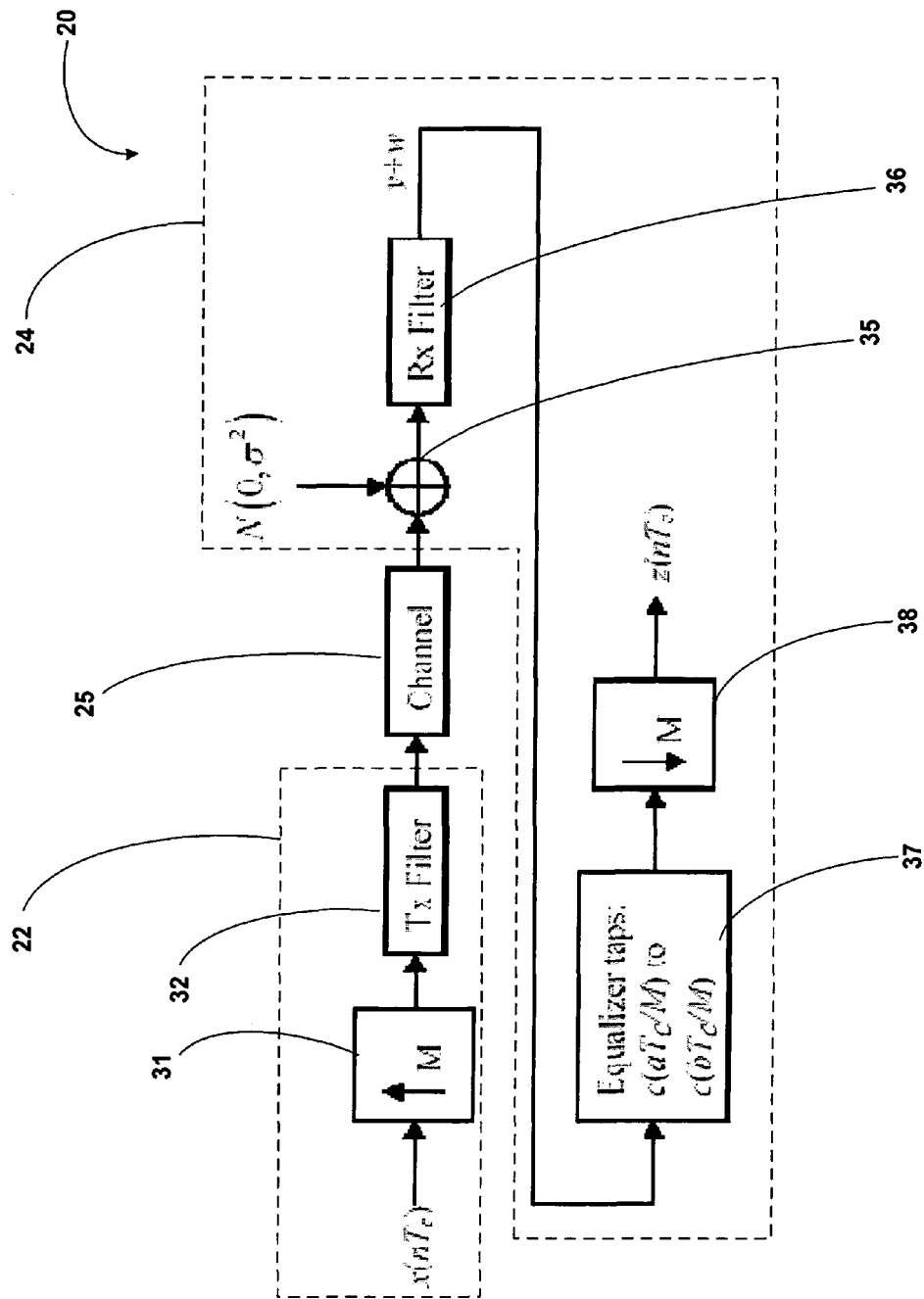
FIG. 2 is a more detailed block diagram of a system that includes a device that implements equalization techniques as described herein.

FIG. 2 is a more detailed block diagram of a system 20, which may correspond to system 10 of FIG. 1. System 20 of FIG. 2 includes a sending device 22 that sends spread spectrum wireless communication to receive device 24 over a communication channel 25.

As shown in FIG. 2, sending device 22 may include a pulse shaper 31. Pulse shaper 31 generally represents various units or components that perform modulation of baseband chips onto a carrier waveform according to a spread spectrum wireless communication standard. Sending device 22 also includes a transmit filter 32. Information is sent from sending device 22 to receive device 24 via communication channel 25.

Receive device 24 includes various RF processing components such as an adder 35 and a receive filter 36. The illustrated input to the adder "N(0,sigma$^2$)" represents noise with mean zero and variance sigma squared. An equalizer 38 has programmable taps that are capable of handling inputs at factional chip values. Receive device 24 also includes a de-shaper 37 that generally represents the units or components that perform down conversion to remove the baseband chips from a carrier waveform according to the spectrum wireless communication standard. It should be noted that digital-to-analog conversion at sending device 22 and analog-to-digital conversion at receive device 24 is not shown in FIG. 2. Digital-to-analog conversion at sending device 22 typically occurs prior to the filtering by transmit filter 32, whereas analog-to-digital conversion typically occurs prior to the filtering by receive filter 36.

The notation in FIG. 2 accounts for complex-valued chips. Filtering at the transmitter and the receiver are typically done at a M times the chip rate, wherein M represents the number of samples per chip. Other filtering rates, however, could also be used. The channel impulse response may correspond to the M times the chip rate spacing. Equalizer 38 has taps spaced Tc/M apart, wherein Tc represents the chip period in seconds and M represents the number of samples per chip.

The following Table 1 outlines various symbols used in this disclosure, and the corresponding description of such symbols

TABLE 1

| Symbol | Description |
|---|---|
| $T_c$ | Chip period in seconds |
| M | Number of samples per chip ($T_c$ seconds). In examples, we usually set M = 2. |
| h (k $T_c$/M) | Overall impulse response (including the effects of transmit filter, channel filter, receive filter). This is a discrete-time sequence with M symbols per $T_c$ seconds. |

TABLE 1-continued

| Symbol | Description |
|---|---|
| x(n$T_c$) | The input to the pulse shaper at the transmitter. This is a discrete-time sequence with one entry per chip. This is a wide-sense stationary random process with unit energy per chip. It consists of all data that go to make $I_{or}$. This sequence is already scrambled. The scrambling sequence is assumed to be i.i.d with zero mean. This makes the x(n$T_c$) sequence a zero-mean uncorrelated sequence, i.e., E[x(n$T_c$)x*(m$T_c$)] = E[|x(0)|$^2$] · δ(n − m) = $I_{or}$ · δ(n − m) = δ(n − m). |
| $p_n$ | The scrambling sequence. This is an i.i.d, zero-mean sequence. |
| y(k $T_c$/M) | Data input to the equalizer filter. This data is already receiver filtered (matched to the transmitter pulse). There are M symbols per $T_c$ seconds. |
| z (k $T_c$) | The output of the equalizer filter. One entry per chip. There is an inherent subsampling between the input to the equalizer and the output of the equalizer. Input contains M symbols per chip, whereas output is one symbol per chip. We wish to make z (k $T_c$) close to x (k $T_c$) in an MMSE sense. |
| w (k $T_c$/M) | Sampled noise after receiver filtering (matched to the transmitter pulse). Naturally, this discrete-time random process is correlated. |
| c (k $T_c$/M) | The equalizer filter coefficients. Tap-spacing is $T_c$/M. |
| L | The length of the equalizer. L is assumed to be an even number for convenience. |
| r (k $T_c$/M) | The impulse response of the received signal after transmitter and receiver filtering, when the channel is ideal. This is a sampling of the inverse Fourier transform of the raised cosine spectrum with excess bandwidth 0.22. This is also the (normalized) correlation of two noise samples w spaced k $T_c$/M apart. |
| σ | Noise standard deviation prior to receiver filtering. |
| Z, 2Z, 2Z + 1 | The set of integers, the set of even integers, and the set of odd integers, respectively. |

Referring again to FIG. 1, the input to equalizer 16 may be represented as:

$$y\left(\frac{kT_c}{M}\right)$$

and may be generally given by the following equation:

$$y\left(\frac{kT_c}{M}\right) = \sum_{n \in \mathbb{Z}} x(nT_c) \cdot h\left(\frac{kT_c}{M} - nT_c\right) + w\left(\frac{kT_c}{M}\right), \quad \text{Equation 1}$$

for $k \in \mathbb{Z}$.

It is desirable to identify the MMSE that achieves linear representation of a transmitted chip x(t$T_c$), where t is an integer, based on a finite number of symbols of the received y stream. This results in the following equation:

$$z(tT_c) = \sum_{k=a}^{b} c\left(\frac{kT_c}{M}\right) \cdot y\left(tT_c - \frac{kT_c}{M}\right), \text{ for } t \in \mathbb{Z}. \quad \text{Equation 2}$$

The end points of filtering may be time instances $aT_c/M$ and $bT_c/M$ with both ends included. For a filter spanning L taps, the quantities a and b could be, e.g., $a=-L/2+1$ and $b=L/2$. The quantity $c(kT_c/M)$ constitutes the equalizer filter coefficients.

One goal, according to this disclosure, is to minimize the mean square error represented by:

$$E[|z(tT_c)-x(tT_c)|^2]$$

In performing this minimization, chip-spaced outputs of the equalizer are very important, and hence the target time instances $tT_c$ are also very important, wherein t is an integer.

The error given by:

$$[z(tT_c)-x(tT_c)]$$

should be orthogonal to the observations that generate the estimate. In other words, for a fixed $$E\left[(z(tT_c) - x(tT_c)) \cdot y^*\left(tT_c - \frac{jT_c}{M}\right)\right] = 0, \quad \text{Equation 3}$$

$$\text{for } j = a, a+1, \ldots, b.$$

This expectation applies with respect to the statistics of all components of the input (contributing towards $I_{OR}$), the statistics of the scrambling sequence, and the statistics of the noise. $I_{OR}$ represents the total base station power. The above set of equations can be rewritten for a fixed $$E\left[\left[\sum_{k=a}^{b} c\left(\frac{kT_c}{M}\right) \cdot y\left(tT_c - \frac{kT_c}{M}\right) - x(tT_c)\right] \cdot y^*\left(tT_c - \frac{jT_c}{M}\right)\right] = 0, \quad \text{Equation 4}$$

$$\text{for } j = a, a+1, \ldots, b.$$

The cross correlation term can be determined using Equation 1, as follows:

$$E\left[x(tT_c) \cdot y^*\left(tT_c - \frac{jT_c}{M}\right)\right] = E\left[x(tT_c) \cdot \left[\sum_{n \in \mathbb{Z}} x(nT_c) \cdot h\left(\frac{(tM-j)T_c}{M} - nT_c\right) + w\left(\frac{(tM-j)T_c}{M}\right)\right]^*\right] = \quad \text{Equation 5}$$

$$E\left[x(tT_c) \cdot \left[x(tT_c) h\left(\frac{-jT_c}{M}\right)\right]^*\right] =$$

$$E[|x(0)|^2] \cdot h^*\left(\frac{-jT_c}{M}\right) = h^*\left(\frac{-jT_c}{M}\right).$$

In the above chain of equalities that yield Equation 5, the first equality follows by using Equation 1 with k replaced by $tM-j$. The second equality follows because the transmitted symbol $x(tT_c)$ is independent of the noise sequence w, and uncorrelated with $x(nT_c)$ when n is not equal to t, because the scrambling sequence is an i.i.d. (independent and identically distributed) sequence with zero mean. The third equality follows because the transmitted symbol $x(tT_c)$ comprises independent zero-mean data on the different orthogonal variable spreading factor (OVSF) codes. Moreover, $$E[|x(0)|^2]=1.$$

The auto-correlation term can be evaluated as follows:

$$E\left[\begin{array}{l} y\left(tT_c - \frac{kT_c}{M}\right) \cdot \\ y^*\left(tT_c - \frac{jT_c}{M}\right) \end{array}\right] = E\left[\left[\begin{array}{l} \sum_{m \in \mathbb{Z}} x(mT_c) \cdot \\ h\left(\frac{(tM-k)T_c}{M} - mT_c\right) + \\ w\left(\frac{(tM-k)T_c}{M}\right) \end{array}\right] \cdot \right. \quad \text{Equation 6}$$

$$\left.\left[\begin{array}{l} \sum_{n \in \mathbb{Z}} x(nT_c) \cdot \\ h\left(\frac{(tM-j)T_c}{M} - nT_c\right) + \\ w\left(\frac{(tM-j)T_c}{M}\right) \end{array}\right]^*\right]$$

$$= E\left[\left[\sum_{m \in \mathbb{Z}} x(mT_c) \cdot h\left(\frac{(tM-k)T_c}{M} - mT_c\right)\right]\right.$$

$$\left.\left[\sum_{n \in \mathbb{Z}} x(nT_c) \cdot h\left(\frac{(tM-j)T_c}{M} - nT_c\right)\right]^*\right] +$$

$$E\left[w\left(\frac{(tM-k)T_c}{M}\right) w^*\left(\frac{(tM-j)T_c}{M}\right)\right]$$

$$= \left[\sum_{m \in \mathbb{Z}} h\left(\frac{(tM-k)T_c}{M} - mT_c\right) \cdot h^*\left(\frac{(tM-j)T_c}{M} - mT_c\right)\right] +$$

$$\sigma^2 \cdot r\left(\frac{(j-k)T_c}{M}\right)$$

$$= \left[\sum_{l \in \mathbb{Z}} h\left(lT_c - \frac{kT_c}{M}\right) h^*\left(lT_c - \frac{jT_c}{N}\right)\right] +$$

$$\sigma^2 \cdot r\left(\frac{(j-k)T_c}{M}\right).$$

The above series of equations, which lead to Equation 6, can be obtained as follows. The first equality follows by substitution of Equation 1 with k replaced by $tM-k$ in the first y term and by $tM-j$ in the second $y^*$ term. The second equation follows because the signal $x(nT_c)$ at the input of the pulse-shaping filter is independent of the noise added by the channel. The first term in the third equation follows because the scrambling sequence is i.i.d. with mean 0 and therefore:

$$E[x(nT_c) \cdot x^*(mT_c)] = \delta(n-m),$$

i.e., the $x(nT_c)$ is uncorrelated with unit energy. The double summation (over n and m) therefore becomes a single summation (over m). The second term follows because this is the result of white noise filtered by the receiver root-raised-cosign waveform. The last equation is obtained by setting $l=t-m$ and by observing that when l runs through the integers, so does m.

Square matrices A and R (of $(b-a+1)^2$ elements) can be defined as:

$$A(j, k) = \sum_{l \in \mathbb{Z}} h\left(lT_c - \frac{kT_c}{M}\right) \cdot h^*\left(lT_c - \frac{jT_c}{M}\right), \quad \text{Equation 7}$$

and $$R(j, k) = \sigma^2 r\left(\frac{(j-k)T_c}{M}\right). \quad \text{Equation 8}$$

The orthogonality conditions in Equation 4 can then be expressed as:

$$\sum_{k=a}^{b} [A(j,k) + R(j,k)] \cdot c\left(\frac{kT_c}{M}\right) = h^*\left(\frac{-jT_c}{M}\right), \quad \text{Equation 9}$$

for $j = a, a+1, \ldots, b$.

This is equivalently represented in matrix form as:

$$[A+R]\begin{bmatrix} c\left(\frac{aT_c}{M}\right) \\ c\left(\frac{(a+1)T_c}{M}\right) \\ \vdots \\ c\left(\frac{bT_c}{M}\right) \end{bmatrix} = \begin{bmatrix} h^*\left(\frac{-aT_c}{M}\right) \\ h^*\left(\frac{-(a+1)T_c}{M}\right) \\ \vdots \\ h^*\left(\frac{-bT_c}{M}\right) \end{bmatrix} \quad \text{Equation 10}$$

To see that Equation 10 makes intuitive sense, one can consider the special case where noise is dominant, i.e., $R+A \cong \sigma^2 I$, when $M=1$ (for a chip-spaced equalizer). In this case, it is clear that c is proportional to $h^*(-n)$, i.e., the rake filter that matches the channel impulse response. It should be noted that vector c is written just as a filter would be written, but the vector on the right side of Equation 10 containing h is written in time-reversed order.

Several key observations can be made with respect to Equation 10. First, A and R are Hermitian matrices. These are easy to verify from Equation 7 and Equation 8, respectively, and the property that the r sequence is symmetric and real.

Second, A is generally not a Toeplitz matrix. To see this, simply let M=2, and consider A(0,0) and A(1,1). These are given by:

$$A(0,0) = \sum_{l \in Z} h(lT_c) \cdot h^*(lT_c)$$

$$A(1,1) = \sum_{l \in Z} h\left(lT_c - \frac{T_c}{2}\right) \cdot h^*\left(lT_c - \frac{T_c}{2}\right)$$

The first quantity is the energy of ontime components of the composite channel response (where the composite channel is the transmitted, the channel and the receiver filter taken together). The second quantity is the energy of the early components of the composite channel response. These two elements are not necessarily the same. The key fact that results in the non-Toeplitz nature of A is the non-stationary (more precisely, non-wide-sense-stationary) nature of the chip×M input sequence going into the pulse-shaping filter. So, each of the M phases of the input to the equalizer filter have different statistics.

A(j,k) can be simplified as follows for the case where M=2. For $$k \in 2\mathbb{Z},$$

the quantity $A_0(j-k)$ can be defined as:

$$A(j,k) = \sum_{l \in Z} h\left(lT_c - \frac{kT_c}{2}\right) \cdot h^*\left(lT_c - \frac{jT_c}{2}\right)$$

$$= \sum_{m \in Z} h(mT_c) \cdot h^*\left(mT_c - \frac{(j-k)T_c}{2}\right)$$

$$\stackrel{\Delta}{=} A_0(j-k).$$

Similarly for $$k \in 2\mathbb{Z}+1,$$

the quantity $A_1(j-k)$ can be defined as:

$$A(j,k) = \sum_{l \in Z} h\left(lT_c - \frac{kT_c}{2}\right) \cdot h^*\left(lT_c - \frac{jT_c}{2}\right)$$

$$= \sum_{m \in Z} h\left(mT_c - \frac{T_c}{2}\right) \cdot h^*\left(mT_c - \frac{T_c}{2} - \frac{(j-k)T_c}{2}\right)$$

$$\stackrel{\Delta}{=} A_1(j-k).$$

The quantity $A_0(j-k)$ represents sample correlations (j−k) $T_c/2$ seconds apart, with a starting address corresponding to an ontime sample. The quantity $A_1(j-k)$ represents sample correlations (j−k)$T_c/2$ seconds apart, but with a starting address corresponding to an early sample.

If a is assumed to be an odd integer and b is assumed to be an even integer, the matrix A specializes to the following form:

$$\begin{bmatrix} A_1(0) & A_0(-1) & A_1(-2) & \cdots & A_1(-b+a+1) & A_0(-b+a) \\ A_1(1) & A_0(0) & A_1(-1) & \cdots & A_1(-b+a+2) & A_0(-b+a+1) \\ A_1(2) & A_0(1) & A_1(0) & \cdots & A_1(-b+a+3) & A_0(-b+a+2) \\ \vdots & \vdots & \vdots & \ddots & \vdots & \\ A_1(b-a-1) & A_0(b-a-2) & A_1(b-a-3) & \cdots & A_1(0) & A_0(-1) \\ A_1(b-a) & A_0(b-a-1) & A_1(b-a-2) & \cdots & A_1(1) & A_0(0) \end{bmatrix}$$

The diagonal elements of the matrix above alternate for the case M=2. In general, the diagonal elements repeat with a periodicity of M. Because the matrix is no longer Toeplitz, care must be taken when employing frequency-domain equalization. To do this, the matrix can be broken into four smaller Toeplitz matrices and the four smaller Toeplitz matrices can be used to perform the frequency-domain equalization.

As described in S. U. H Qureshi, "Adaptive Equalization," Proceedings of the IEEE, vol. 73, no. 9, pp. 1349-1387, September, 1985, in a system with excess bandwidth less than 1, (notably the pulse widths in the WCDMA system have an excess bandwidth of 0.22), the correlation matrix corresponding to a finite number of equalizer taps is nonsingular, even when noise is absent. The least means squared (LMS) algorithm will therefore converge to a unique solution even in high geometry conditions.

Referring again to FIG. 1, in equalizer 16 of receive device 14, correlations and channel impulse response are obtained at $T_c/2$ spacing, i.e., M=2, which results in fractional tap spacing for the filtering by equalizer 16. As set forth above, when k is an integer, $$A(j, k) + R(j, k) = A_0(j - k) + R(j - k)$$
$$= E\begin{bmatrix} y\left(tT_c - \frac{kT_c}{2}\right) \cdot \\ y^*\left(tT_c - \frac{jT_c}{2}\right) \end{bmatrix}$$

and $$A(j + 1, k + 1) + R(j + 1, k + 1) = A_1(j - k) + R(j - k)$$
$$= E\begin{bmatrix} y\left(tT_c - \frac{(k+1)T_c}{2}\right) \cdot \\ y^*\left(tT_c - \frac{(j+1)T_c}{2}\right) \end{bmatrix}$$

are different. The first quantity corresponds to an ontime starting address, and the second to an early time starting address. Therefore, it is highly desirable for equalizer 16 to be capable of returning estimates of the following quantities:

$$A_0(j)+R(j) \text{ and } A_1(j)+R(j), \text{ for } j=0,1,\ldots,b-a.$$

These are estimated (with the caret symbol denoting an estimated value instead of the true value) as follows:

$$\hat{A}_0(j) + \hat{R}(j) = \sum_s \left[y(sT_c) \cdot y^*\left(sT_c - \frac{jT_c}{2}\right)\right],$$

for $$j = 0, 1, \ldots, b - a;$$

and $$\hat{A}_1(j) + \hat{R}(j) = \sum_s \left[y\left(sT_c - \frac{T_c}{2}\right) \cdot y^*\left(sT_c - \frac{T_c}{2} - \frac{jT_c}{2}\right)\right],$$

for $$j = 0, 1, \ldots, b - a.$$

As can be observed in these equations directly above, the starting addresses are offset by one half-chip for the two estimates. Moreover, the accumulation over s is at chip spacing. Finally, the accumulation length is a parameter that can be programmably set. It may be convenient to set this accumulation length, for example, to be a multiple of 256. This can also provide for improved estimates of the diagonal elements of the matrix A+R.

The quantity 2*(b−a+1) describes the correlation matrix of the input into the equalizer. In particular, this quantity describes the lower-triangular portion of the A+R matrix. The upper triangular portion of the matrix can be automatically determined because both A and R are Hermitian matrices.

In one implementation, the functionality of equalizer 16 is implemented in software and hardware. The software may execute on a digital signal processor (DSP) (not illustrated in FIG. 1) that programs even correlation accumulation starting at address $tT_c$. In this case, hardware in equalizer 16 can return both sets of estimates corresponding to accumulation starting address $tT_c$ for the first subset of correlations giving:

$$(\hat{A}_0(j)+\hat{R}(j)),$$

and accumulation for starting address $tT_c-T_c/2$ for the second subset of correlations giving:

$$(\hat{A}_1(j)+\hat{R}(j)).$$

For an alternative second implementation of equalizer 16, software executing on the DSP may trigger correlation twice, by programming staring address $tT_c$ for the first time and starting address $tT_c-T_c/2$ for the second time. Hardware in equalizer 16 may return either $$(\hat{A}_0(j)+\hat{R}(j))$$

or $$(\hat{A}_1(j)+\hat{R}(j))$$

depending on whether the programmed starting address corresponds to an "ontime" or "early" sample. In this case, the DSP programs two tasks to get the same information obtained in the first implementation described above. In either case, hardware could also be used to estimate the channel impulse response according to conventional channel impulse response estimation techniques.

Software executing on a DSP could also make use of the correlation estimates by accounting for the fact that the correlation matrix is not Toeplitz, but can be divided into four Toeplitz sub-matrices. Toeplitz sub-matrices can then be exploited in order to implement frequency-domain equalization, if desired.

As mentioned above, the equalization techniques described herein are capable of handing antenna diversity. Again, antenna diversity refers to wireless communication in which the transmit or receiving device implements multiple antennas for the transmission or reception of wireless signals. Transmit diversity involves signal transmission from multiple transmit antennas. Receive diversity involves reception of signals using multiple receive antennas.

For transmit diversity, suppose that the pilot and data channels are code division multiplexed (as in a WCDMA system). The pilot patterns on two different antennas can allow a searcher to identify the channel's impulse response on the path from the transmitter to the receiver. In particular, the pattern on the common pilot channel (CPICH) may be as follows:

$$\begin{bmatrix} Ant0 \to \\ Ant1 \to \end{bmatrix} =$$

$$\begin{bmatrix} 1 & 1 & 1 & 1 & 1 & 1 & 1 & 1 & 1 & 1 & 1 & \ldots & 1 & 1 & 1 \\ 1 & -1 & -1 & 1 & 1 & -1 & -1 & 1 & 1 & -1 & -1 & 1 & \ldots & 1 & 1 & -1 \end{bmatrix}$$

Each symbol (1 or −1) represented above is a 256 chip symbol, which is multiplied by (1+j) to yield a complex symbol (which is scrambled later). There may be 150 symbols in a frame. Notably, the periodicity may be 4 within the 150 symbols and 150 MOD 4=2. Therefore, the last pattern may not be completed and the above pattern may reset at a start of a frame.

In closed-loop transmitter diversity, the data on a second antenna (Ant1) may have a constant phase offset relative to data on a first antenna (Ant0). This phase offset may change at a rate of once per slot. The following expression $$x_a(kT_c/M), a=0, 1,$$

is denoted as the combined transmissions from the two different antennas. Then, let $$h_a(kT_c/M)$$

represent the channel response from transmitter antenna a to the receiver (assumed as being a single antenna receiver in this example). The received signal is then given by:

$$y\left(\frac{kT_c}{M}\right) = \sum_{n \in Z} x_0(nT_c) \cdot h_0\left(\frac{kT_c}{M} - nT_c\right) + \sum_{n \in Z} x_1(nT_c) \cdot h_1\left(\frac{kT_c}{M} - nT_c\right) + w\left(\frac{kT_c}{M}\right),$$

Equation 11

The phase offset of the data signals on the two transmitter antennas can be set so as to align the data so that, at the receiver, the data signals reinforce one another. Thus, having one equalizer configured to produce:

$$x_0(kT_c/M)$$

and another configured to produce:

$$x_1(kT_c/M),$$

in the MMSE sense, is not the right criterion. This is because, in performing the equalization, information indicating that there is a phase offset between the channels is lost, and the data needs to be realigned to compensate for this.

Let $d(kT_c/M)$ represent the half-chip data component transmitted over a $0^{th}$ antenna, and let $(w_1)d(kT_c/M)$ represent the half-chip data component transmitted over a $1^{st}$ antenna. In this case, the goal is to minimize:

$$E[|z(tT_c)-d(tT_c)|^2],$$

at chip instances, where $z(tT_c)$ is given by Equation 2 with c being replaced by $c_d$, where the subscript d represents a filter that configured to produce the actual data in an MMSE sense. The orthogonality principle of Equation 3 may require evaluation of a cross-term in a manner analogous to Equation 5. This is given as follows:

$$E\left[d(tT_c) \cdot y^*\left(tT_c - \frac{jT_c}{M}\right)\right] = E\left[d(tT_c) \cdot \begin{bmatrix} \sum_{n \in Z} x_0(nT_c) \cdot h_0\left(\frac{(tM-j)T_c}{M} - nT_c\right) + \\ \sum_{n \in Z} x_1(nT_c) \cdot h_1\left(\frac{(tM-j)T_c}{M} - nT_c\right) + \\ w\left(\frac{(tM-j)T_c}{M}\right) \end{bmatrix}^*\right]$$

$$= E\left[d(tT_c) \cdot \left[x_0(tT_c)h_0\left(\frac{-jT_c}{M}\right)\right]^*\right] +$$

$$E\left[d(tT_c) \cdot \left[x_1(tT_c)h_1\left(\frac{-jT_c}{M}\right)\right]^*\right]$$

$$= E[|d(0)|^2]\left(h_0^*\left(\frac{-jT_c}{M}\right) + w_1^* h_1^*\left(\frac{-jT_c}{M}\right)\right).$$

In the above chain of equalities, the first equality follows by using Equation 11 with k replaced by tM−j. The second equality follows because the transmitted symbol d(tTc) is independent of the noise sequence w, and uncorrelated with xa(nTc) when n is not equal to t, a=0, 1, because the scrambling sequence is an i.i.d sequence with zero mean. The third equality follows because the transmitted symbol d(tTc) comprises independent zero-mean data on the different OVSF codes. Moreover, the weights of this data on the two antennas are 1 and $w_1$.

The autocovariance matrix can be denoted as A+R, just as outlined above. The manner in which A and R depend on h0 and h1 will be different, but this is not of consequence because, one can estimate the autocovariance and use this estimated matrix to get the equalizer filter.

The final matrix equation to solve is:

$$[A+R]\begin{bmatrix} c_d\left(\frac{aT_c}{M}\right) \\ c_d\left(\frac{(a+1)T_c}{M}\right) \\ \vdots \\ c_d\left(\frac{bT_c}{M}\right) \end{bmatrix} =$$

Equation 12

$$E[|d(0)|^2]\left(\begin{bmatrix} h_0^*\left(\frac{-aT_c}{M}\right) \\ h_0^*\left(\frac{-(a+1)T_c}{M}\right) \\ \vdots \\ h_0^*\left(\frac{-bT_c}{M}\right) \end{bmatrix} + w_1^*\begin{bmatrix} h_1^*\left(\frac{-aT_c}{M}\right) \\ h_1^*\left(\frac{-(a+1)T_c}{M}\right) \\ \vdots \\ h_1^*\left(\frac{-bT_c}{M}\right) \end{bmatrix}\right).$$

It should be emphasized that the A matrix in Equation 12 may be different from the A matrix in Equation 10.

At this point, it is desirable to equalize the pilot chip at time t, i.e., $p(tT_c)$. This is needed to compensate for any receiver induced phase artifacts, and is executed after equalization. Techniques similar to those outlined above can be used to minimize $$E[|z_p(tT_c)-p(tT_c)|^2],$$

where $z_p$ is the equalized pilot sequence. The following equation, analogous to Equation 12 is obtained:

$$[A+R]\begin{bmatrix} c_{p,i}\left(\frac{aT_c}{M}\right) \\ c_{p,i}\left(\frac{(a+1)T_c}{M}\right) \\ \vdots \\ c_{p,i}\left(\frac{bT_c}{M}\right) \end{bmatrix} = E[|p(0)|^2]$$

$$\left(\begin{bmatrix} h_0^*\left(\frac{-aT_c}{M}\right) \\ h_0^*\left(\frac{-(a+1)T_c}{M}\right) \\ \vdots \\ h_0^*\left(\frac{-bT_c}{M}\right) \end{bmatrix} + w_{p,i}^* \begin{bmatrix} h_1^*\left(\frac{-aT_c}{M}\right) \\ h_1^*\left(\frac{-(a+1)T_c}{M}\right) \\ \vdots \\ h_1^*\left(\frac{-bT_c}{M}\right) \end{bmatrix}\right)$$

Equation 13 where $w_{p,i}$ is the pilot weight on antenna 1 with respect to antenna 0, for the chip of interest t. This is either 1 or −1 depending on the 256 chip phase within the 10 millisecond frame. According to this weight, the equalizer filter is represented by $c_{p,i}$, where I=0 or 1, is used, wherein c represents the equalization filter weight (tap), p stands for pilot and i stands for the transmit antenna number.

Notably, the data and pilot equalization can be simultaneously achieved using two sets of equalizer component filters $c_i$ that satisfy the following equation for i=0,1

$$[A+R] = \begin{bmatrix} c_{p,i}\left(\frac{aT_c}{M}\right) \\ c_i\left(\frac{(a+1)T_c}{M}\right) \\ \vdots \\ c_i\left(\frac{bT_c}{M}\right) \end{bmatrix} = \begin{bmatrix} h_i^*\left(\frac{-aT_c}{M}\right) \\ h_i^*\left(\frac{-(a+1)T_c}{M}\right) \\ \vdots \\ h_i^*\left(\frac{-bT_c}{M}\right) \end{bmatrix}$$

Equation 14

The following equations provide the data and pilot equalizer coefficients from the component filters $c_0$ and $c_1$:

$c_d = E[|d(0)|^2][c_0 + w_1^* c_1]$, and $c_{p,i} = E[|p(0)|^2][c_0 + w_{p,1}^* c_1]$, where $w_{p,i}$ is 1 or −1.

In order to achieve outputs for both pilot and data equalizer filters, equalizer 16 (FIG. 1) may invoke a digital signal processor (DSP) programmed to implement component filters $c_0$ and $c_1$. The same data can be filtered twice (once with each of the data and pilot filters) and can be put together based on the closed loop transmit diversity (CLTD) weight. Scaling of $E[|d(0)|^2]$ should already be included. Analogously, the pilot will be put together based on the pilot weight for the symbol within frame. The dot-cross block after the equalization will have an extra traffic to pilot energy scale. In particular, instead of $E[|p(0)|^2]$ the dot-cross block after the equalization has a scale of $E[|d(0)|^2]$), which can be compensated for in the scaling before sending signals to a demodulator backend.

Figure 3:
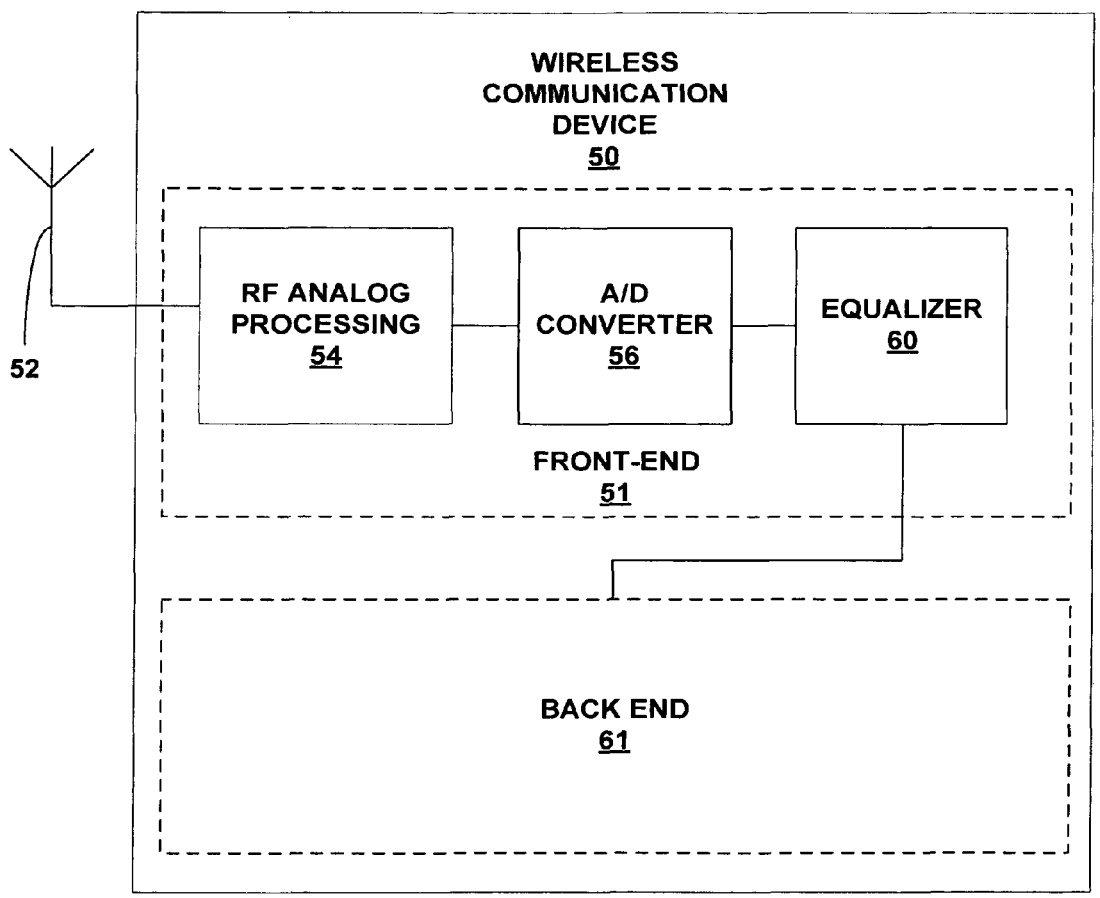
FIG. 3 is a block diagram depicting an embodiment of a wireless communication device including an equalizer that filters received signals according to the techniques of this disclosure.

FIG. 3 is a block diagram depicting one embodiment of a wireless communication device 50 including an equalizer 60 that filters received signals. Wireless communication device 50 may include one or more antennas 52 to receive spread spectrum wireless signals. As outlined herein, the described equalization techniques can be implemented to handle antenna diversity or no diversity.

Wireless communication device 50 can be characterized as having a front end 51 and a back end 61. Front end 51 includes RF analog processing components 54 to perform any necessary or desirable analog processing of the received signal. Front end 51 also includes an analog-to-digital converter 56 to convert a received signal to digital samples.

Equalizer 60 implements one or more of the equalization techniques described herein. In particular, equalizer 60 may be configured to estimate a channel impulse response, estimate channel variance by computing two or more co-variances for different received samples, and select filter coefficients for the equalizer based on the estimated channel impulse response and the estimated channel variance. Equalizer 60 may be fractionally spaced having filter taps spaced one-half chip apart.

Back end 61 includes various components that can be used to process symbols generated by front end 51. In one example, back end 61 includes a de-interleaver to remove any interleaving applied to the data, a de-rate matching unit to perform de-rate matching, and a de-coder to decode the data. For quadrature amplified modulation, loss likelihood ratio (LLR) extraction may be performed by back end 61 prior to de-interleaving. In any case, a digital signal processor (DSP) may be used to implement back end 61 techniques according to spread spectrum demodulation. In some embodiments, a DSP implemented in back end 61 may be invoked by equalizer 60 in order to execute various aspects of the equalization.

Figure 4:
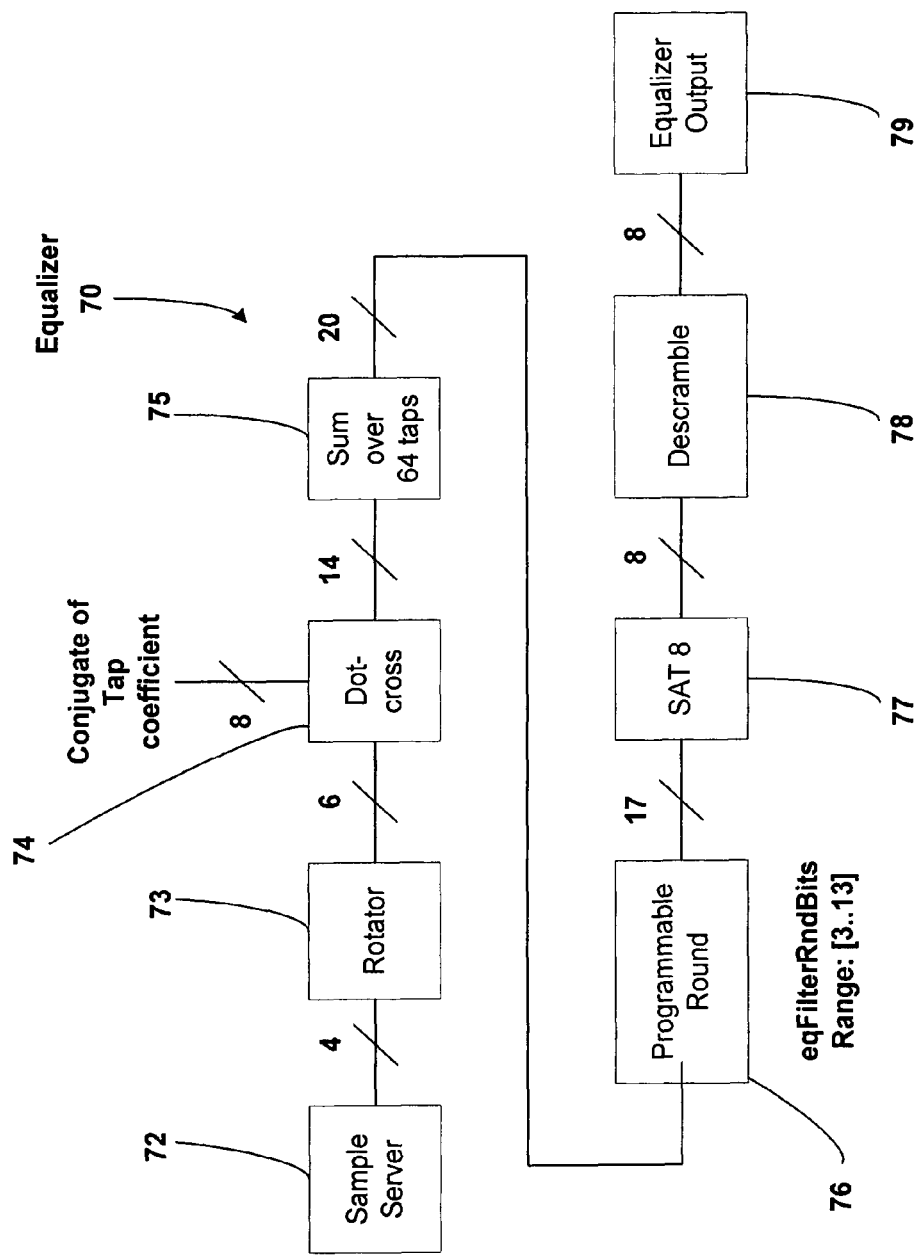
FIG. 4 is one exemplary block diagram depicting various exemplary stages of an equalizer.

FIG. 4 is one exemplary block diagram depicting various exemplary stages of an equalizer 70. The stages shown in FIG. 4 are typically followed by other stages shown in later FIGS. Thus, equalizer 70 may generally correspond to early stages of the equalization performed by equalizer 60 (FIG. 3). Although exemplary bit lengths are illustrated on FIG. 4, the bit lengths could be changed, as desired, for an implementation. Similarly, many other figures described below illustrate exemplary bit lengths. These, however, could be changed for other implementations.

Sample server 72 generally represents a portion of memory that stores samples after analog-to-digital conversion. Rotator 73 cancels frequency error in the received samples and forwards them to dot-cross 74. Dot cross 74 and summation unit 75 may be collectively viewed as the filter of equalizer 70.

Dot cross 74 performs a dot-cross operation, wherein

Dot-cross$(x,y)$=ComplexMultiply$(x,\text{conj}(y))$

FIGS. 5A and 5B respectively illustrate hardware that can be used to solve:

Complex Multiply$(x1+jxQ)(y1+jyQ)$

For convenience in hardware, symmetric saturation may be used, i.e., the range may always be $[-(2^{\wedge}(K-1)-1), (2^{\wedge}(K-1)-1]$, wherein K represents the number of bits used after saturation. As shown in FIG. 5A, product real unit 84 includes two multiplier units 85, 86 that receive the respective inputs (as shown) and generate outputs that are subtracted from each other by adder unit 87. As shown in FIG. 5B, product imaginary unit 94 includes two multiplier units 95, 96 that receive the respective inputs (as shown) and generate outputs that are added to each other by adder unit 97.

Referring again to FIG. 4, summation unit sums over 64 taps, although more or fewer taps could be defined. Programmable rounding unit 76 performs rounding according to implementation (in this example rounding bits in the range of [3 . . . 13]. Saturation unit 77 performs saturation on the signal and descramble unit 78 descrambles the signal using a known code. Equalizer output box 79 generally represents the output of equalizer 70, which can be stored in memory. Different memory addresses can be defined for different equalizer outputs associated with different diversity scenarios.

Figure 6A:
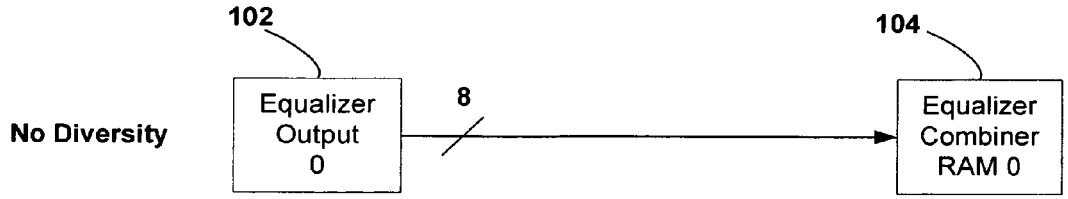
FIGS. 6A-6C are block diagrams respectively illustrating equalizer output being written to memory for different diversity scenarios according to an embodiment of this disclosure.
Figure 6B:
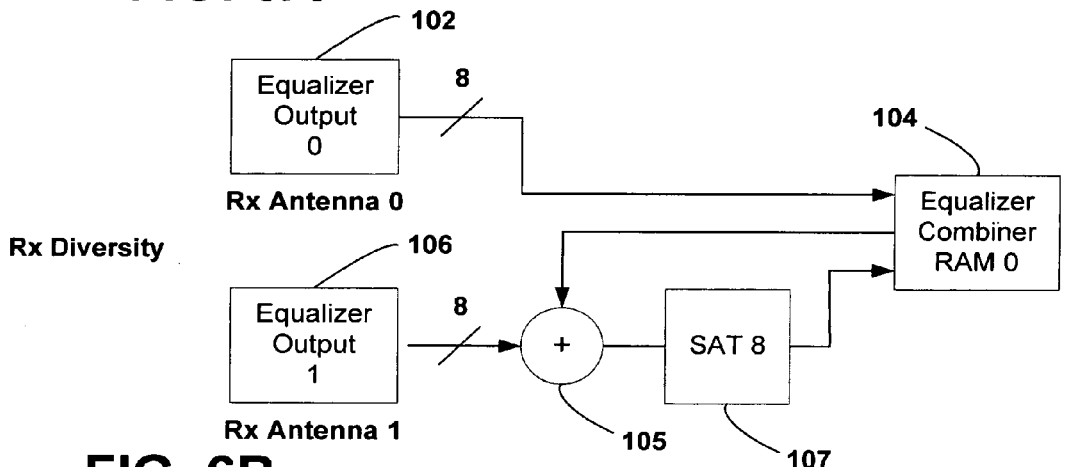
Figure 6C:
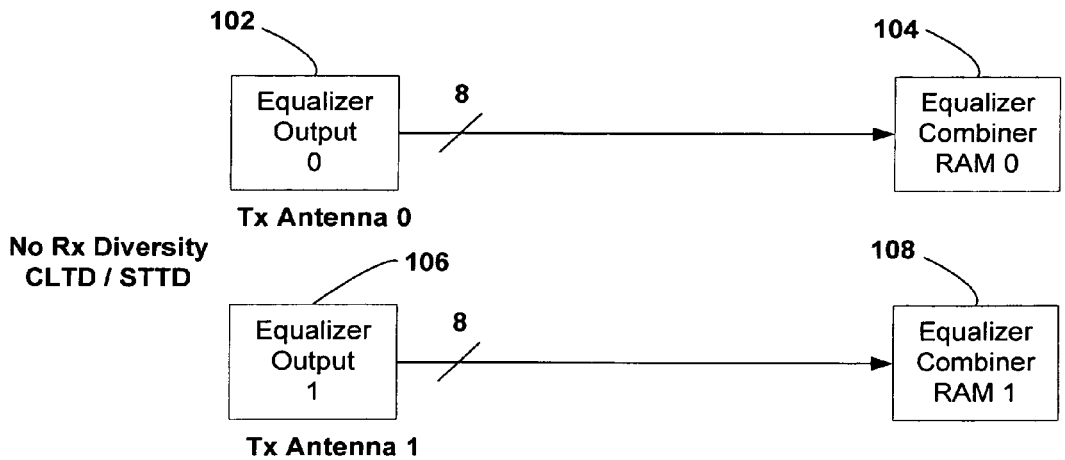

FIGS. 6A-6C are block diagrams respectively illustrating equalizer output being written to memory for different diversity scenarios according to an embodiment of this disclosure. In particular, FIG. 6A illustrates a scenario of no diversity, meaning that the sending device and the receiving device each have a single (non-diverse) antenna. FIG. 6B illustrates a scenario of receive (Rx) diversity, meaning that the receiving device has two or more receive antennas. FIG. 6C illustrates a scenario of transmit (Tx) diversity, meaning that the transmitting device has two or more transmit antennas. For a mobile unit, the diversity scenario (Tx, Rx or no diversity) may be identified to the mobile by a communicating base station. The mobile, then, can operate according to the diversity state identified by the base station.

As can be appreciated from FIGS. 6A-6C a wireless communication device as described herein can include an equalizer configured to combine the output of the two or more equalization filters in a first manner for no diversity (FIG. 6A), combine the output of the two or more equalization filters in a second manner for transmit diversity (FIG. 6C) in which a sending device that sends the signals to the wireless communication device includes multiple transmit antennas, and combine the output of the two or more equalization filters in a third manner for receive diversity (FIG. 6B) in which the wireless communication device includes multiple receive antennas.

For no diversity, as shown in FIG. 6A, equalizer output 0, denoted 102, is simply written to memory location "equalizer combiner RAM," denoted 104. For receive diversity, as shown in FIG. 6B, equalizer output 0, again denoted 102, is combined with equalizer output 1, denoted 106. In particular, as shown in FIG. 6B, equalizer output 0, denoted 102 is stored in equalizer combiner RAM, denoted 104. Equalizer output 1, denoted 106 is then summed with the content of equalizer combiner RAM 0 by adder 105 and saturated by unit 107 to 8 bits before being stored back in equalizer combiner RAM 0.

For transmit diversity, as shown in FIG. 6C, equalizer output 0, denoted 102, is stored in equalizer combiner RAM 0, denoted 104, while equalizer output 1, denoted 106, is stored in equalizer combiner RAM 1, denoted 108.

Figure 7:
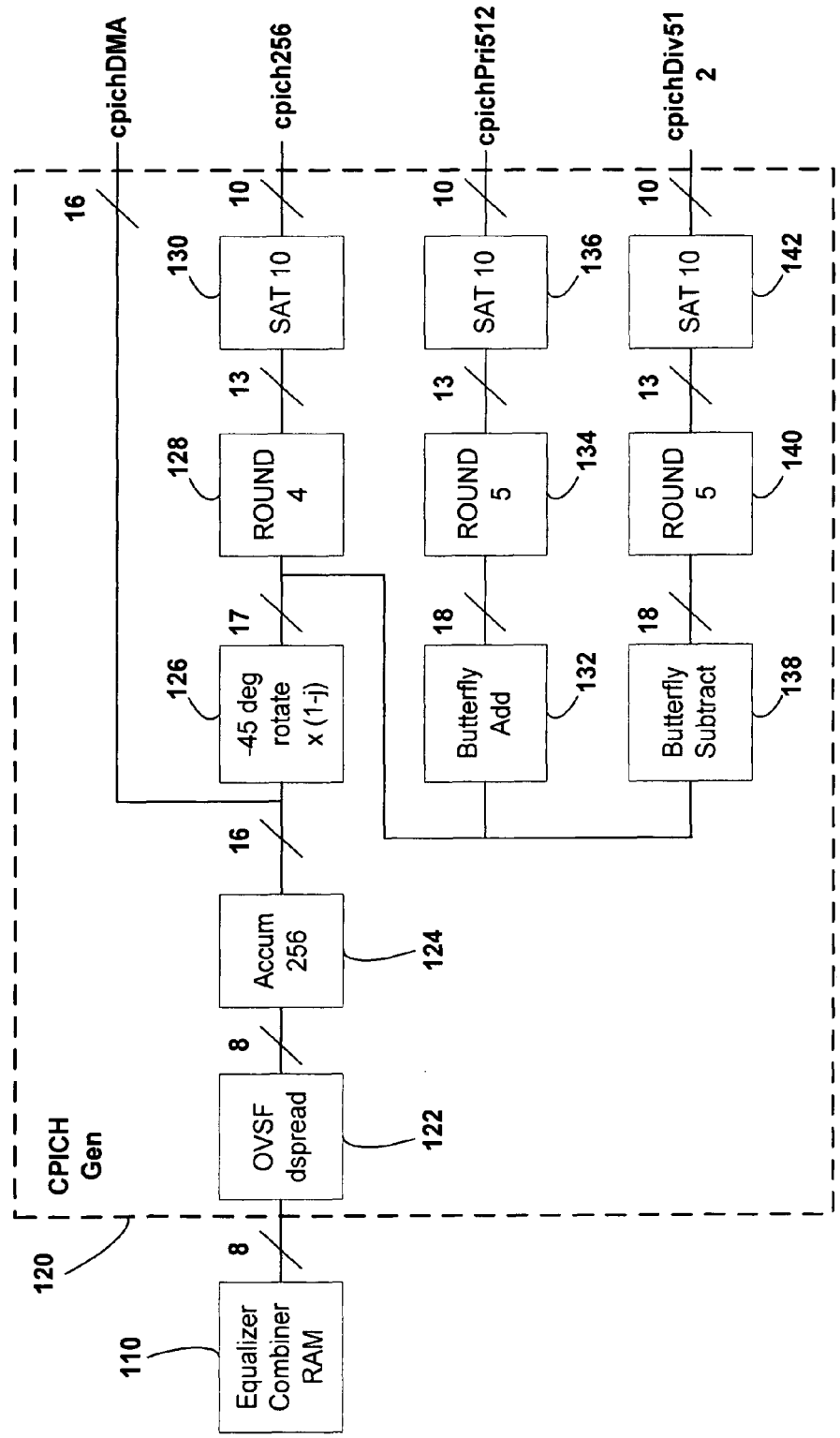
FIG. 7 is a block diagram illustrating a common pilot channel (CPICH) generation unit that can be used to generate different CPICH signals.

FIG. 7 is a block diagram illustrating a common pilot channel (CPICH) generation unit 120 for generating different CPICH signals. CPICH generation unit 120 may form part of equalizer 60 (FIG. 3). Equalizer RAM 110 generally represents either of equalizer RAM 0, denoted 104 in FIGS. 6A-6C or equalizer RAM 1, denoted 108 in FIG. 6C. As outlined in greater detail below, different CPICH signals can be generated based on the diversity. Again, the diversity is known at the mobile unit insofar as a base station communicates this information to the mobile unit.

The cpichDMA, cpich256, cpichPri512 and cpichDiv512 respectively refer to different CPICH signals that can be generated by unit 120. The different CPICH signals may be used for different antenna diversity scenarios as outlined in greater detail below. The cpichDMA is generated in all modes and sent to the demodulator, e.g., demodulator 65 (FIG. 3). The cpich256 is generated if a "diversityPilot" symbol is absent. The cpichPri512 and cpichDiv512 are generated if a "diversityPilot" symbol is present. It should be noted that is can be possible for a "diversityPilot" symbol to be present even if neither the high speed shared control channel (HS-SCCH) nor the high speed physical data shared channel (HS-PDSCH) use transmit diversity.

As shown in FIG. 7, equalizer RAM 110 provides the input to CPICH generation unit 120. CPICH generation unit 120 includes an OVSF dispreading unit 122 that applies orthogonal variable spreading factors (OVSF) in order to multiply the input by a code to facilitate accumulation of the pilot channel. Accumulator 124 accumulates, e.g., over 256 samples, in order to recover the pilot channel. The output of accumulator 124 corresponds to cpichDMA.

In order to generate cpich256, the output of accumulator 124 is rotated 45 degrees by rotator 126. The output of rotator 126 is then rounded by rounding unit 128 to remove 4-bits and saturated to 10-bits by saturation unit 130. The 10-bit output of saturation unit 130 is cpich256. Again, however, the bit lengths at various stages of the generation of CPICH signals could be different for other implementations.

The cpichPri512 and cpichDiv512 signals are used of a transmit diversity state, as described in greater detail below. In order to generate cpichPri512, the output of rotator 126 is sent to butterfly add unit 132, which adds a pair of consecutive CPICH signals in order to cancel out the part of the signal associated with a second transmit antenna, thereby preserving only the part of the signal associated with a first transmit antenna. The output of butterfly add unit 132 is then rounded by rounding unit 134 to remove 5-bits and saturated to 10-bits by saturation unit 136. The 10-bit output of saturation unit 136 is cpichPri512.

In order to generate cpichDiv512, the output of rotator 126 is sent to butterfly subtract unit 138, which subtracts a pair of consecutive CPICH signals in order to cancel out the part of the signal associated with a first transmit antenna, thereby preserving only the part of the signal associated with a second transmit antenna. The output of butterfly subtract unit 138 is then rounded by rounding unit 140 to remove 5-bits and saturated to 10-bits by saturation unit 142. The 10-bit output of saturation unit 142 is cpichDiv512.

Figure 8:
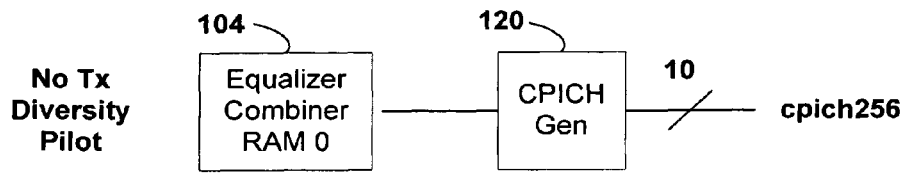
FIGS. 8-13 are block diagrams illustrating different scenarios in which the different CPICH signals are generated.

FIGS. 8-13 are block diagrams illustrating different scenarios in which the different CPICH signals are generated. Some or all of the scenarios depicted in FIGS. 8-13 may be implemented by equalizer 60 (FIG. 3). As shown in FIG. 8, when there is no transmit (Tx) diversity pilot symbols detected at the mobile unit, equalizer combiner RAM 0 (104) provides the input to CPICH generation unit 120, which generates and outputs cpich256.

Figure 9:
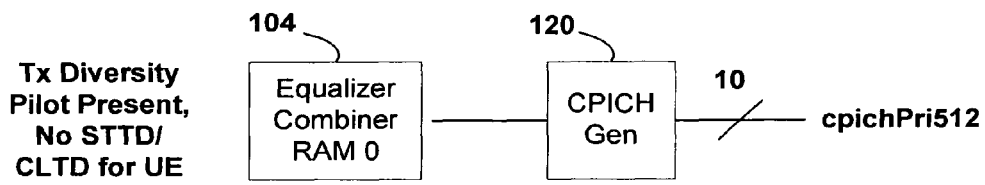

As shown in FIG. 9, when a transmit (Tx) diversity pilot symbol is present but there is no space time transmit diversity (STTD) or closed loop transmit diversity (CLTD) for user equipment (ULE), cpichPri512 is generated and used. UE generally refers to a mobile device, i.e., user equipment. In this case, combiner RAM 0 (104) provides the input to CPICH generation unit 120, which generates and outputs cpich512.

Figure 10:
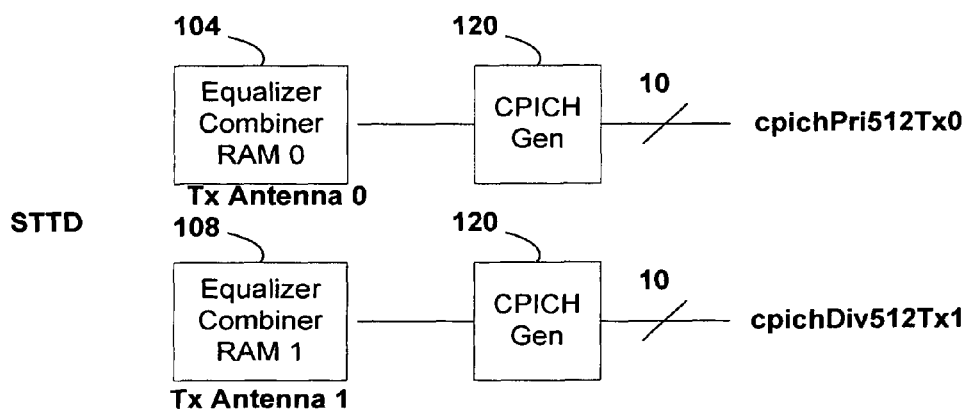

As shown in FIG. 10, when space time transmit diversity (STTD) is being used, cpichPri512 is generated for a $0^{th}$ transmit antenna and cpichDiv512 is generated for a $1^{st}$ transmit antenna. As shown, in this case, equalizer combiner RAM 0 (104) corresponds to the input to CPICH generation unit 120 for transmit antenna 0 and equalizer combiner RAM 1 (108) corresponds to the input to CPICH generation unit 120 for transmit antenna 1. CPICH generation unit 120 uses these respective inputs to generate cpichDiv512 for the $0^{th}$ transmit antenna and cpichDiv512 is generated for a $1^{st}$ transmit antenna.

Figure 11:
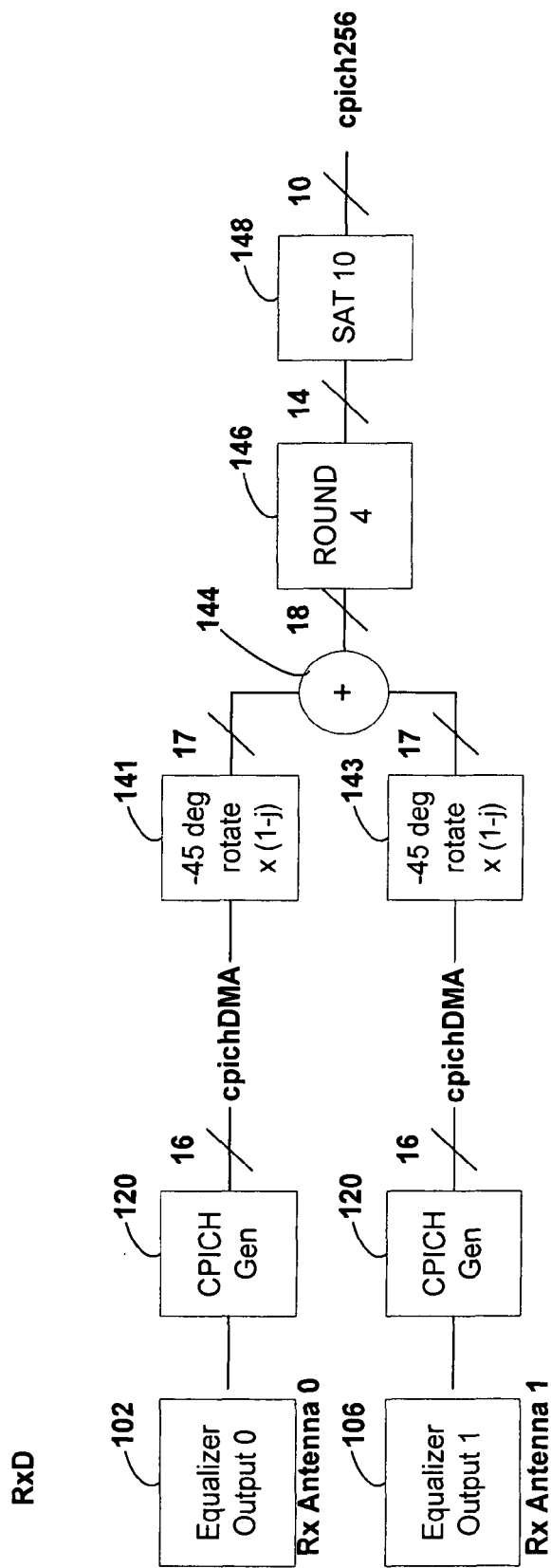

As shown in FIG. 11, for receive (Rx) diversity, a slight modification to the components illustrated in FIG. 7 may be used in order to combine two inputs, corresponding to two receive antennas to generate a single cpich256. In this case, equalizer output 0 (see FIG. 6B, 102) corresponds to receive (Rx) antenna 0 and equalizer output 1 (see FIG. 6B, 106) corresponds to receive (Rx) antenna 1. These respective inputs are each provided to CPICH generation unit 120, which generates cpichDMA for each input. Each respective cpichDMA is then rotated 45 degrees by rotators 141, 143, and the output of rotators 141, 143 is added together by adder 144. The output of adder 144 is rounded by rounding unit 146 to remove 4-bits and then saturated to 10-bits by saturation unit 148. The output of saturation unit 148 comprises cpich256 for the case of receive diversity.

Figure 12:
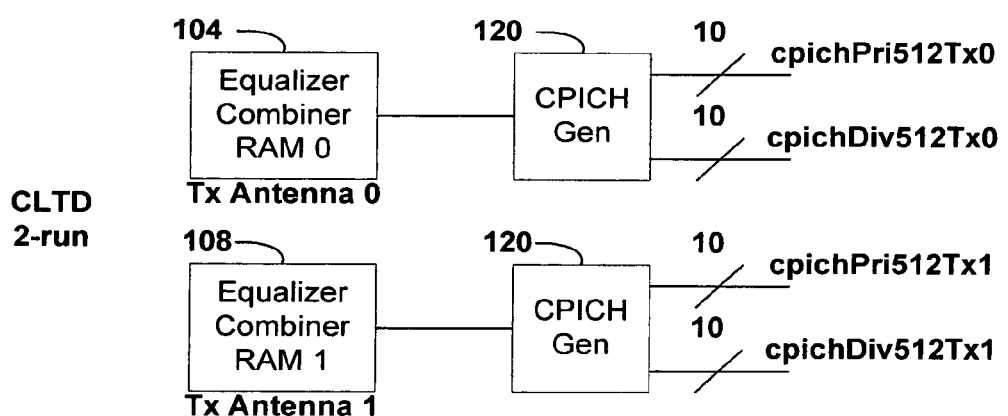

FIG. 12 illustrates the generation of CPICH signals specifically for closed-loop transmit diversity (CLTD) in 2-run mode. 2-run mode refers to a mode in which you equalize the data twice, once for each of two transmit antennas. As shown, for CLTD, equalizer combiner RAM 0 (104) is associated with transmit (Tx) antenna 0 and equalizer combiner RAM 1 (108) is associated with transmit (Tx) antenna 1. CPICH generation unit 120 uses these respective inputs to generate cpichPri512 and cpichDiv512 for the $0^{th}$ transmit antenna, and to generate separate cpichPri512 and cpichDiv512 for the for a $1^{st}$ transmit antenna.

Figure 13:
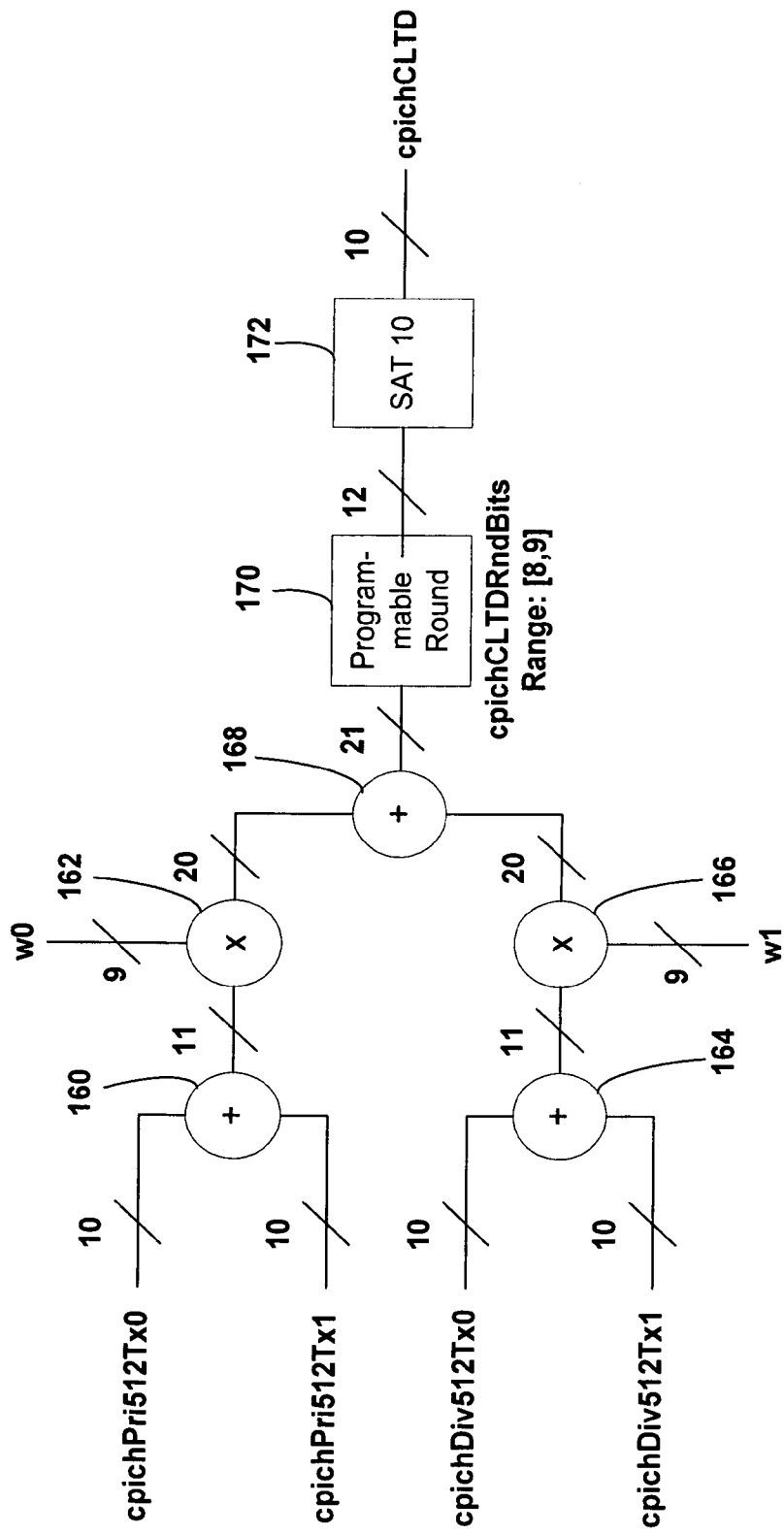

FIG. 13 is a diagram illustrating the generation of cpich-CLTD, which is the control signal for closed loop transmit diversity, based on the respective CPICH signals generated from the illustration of FIG. 12. Notably, FIG. 13 illustrates the generation of CPICH signals for a "2-run mode." For CLTD in 1-run mode, the branches of FIG. 13 corresponding to cpichPri512Tx1 and cpichDiv512Tx1 can be eliminated.

The input to FIG. 13 is the output of FIG. 12, as labeled. As shown, the cpichPri512Tx0 and cpichDiv512Tx0 are summed by adder 160 and the summation is multiplied by w0 using multiplier 162. The variable w0 refers to the closed loop transmit diversity weight for transmit antenna 0. In a similar manner, cpichPri512Tx1 and cpichDiv512Tx1 are summed by adder 164 and the summation is multiplied by w1 using multiplier 166. The variable w1 refers to the closed loop transmit diversity weight for transmit antenna.

The outputs of multipliers 162 and 166 are summed together using adder 168. The output of adder 168 is then fed to programmable rounding unit 170, which in this example, is programmable in a range of [8,9] to round off 8-bits or 9-bits. The output of unit 170 is then saturated to 10-bits by saturation unit 172. The output of saturation unit 172 comprises a CPICH signal for closed loop transmit diversity, i.e., cpich-CLTD.

Figure 14:
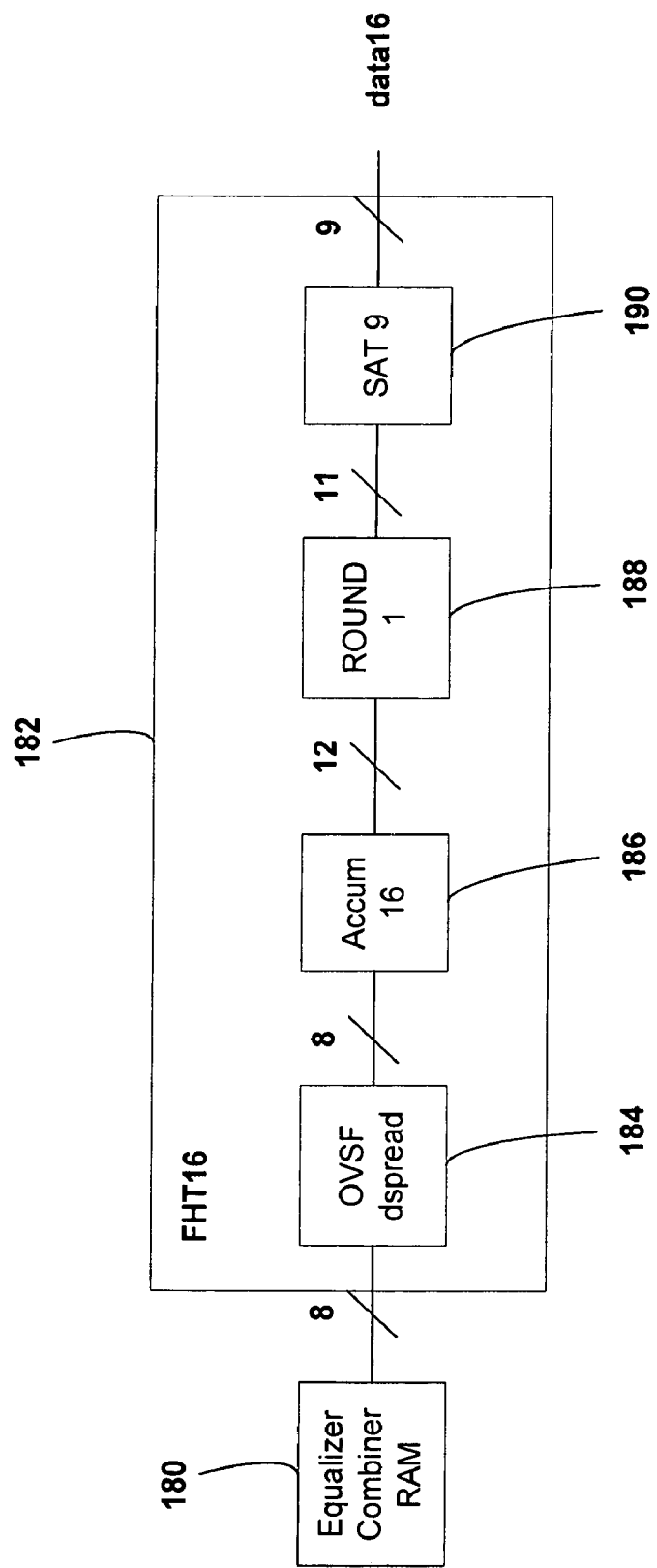
FIG. 14 is a block diagram illustrating a fast hadamard transform (FTH) with a block size of 16, which can be used to extract the data of interest from the stored bits in an equalizer.

FIG. 14 is a block diagram illustrating how the content of equalizer combiner RAM 180 can be used to extract the data of interest from the stored bits. The architecture illustrated in FIG. 14 may form part of equalizer 60 of FIG. 3. Equalizer combiner RAM 180 may correspond to either equalizer combiner RAM 0 (104) or equalizer combiner RAM 1 (108). The same hardware may be used to extract the data from the bits stored in both memory locations. As shown, equalizer combiner RAM 180 provides input to FHT16 (182), which performs the extraction of data bits. FHT16 is a fast hadamard transform (FTH) unit with a block size of 16.

As shown, FHT16 (182) includes an OVSF despreading unit 184, an accumulator 186 that accumulates over 16 cycles, a rounding unit 188 that rounds off 1-bit, and a saturation unit 190 that saturates to 9-bits. The output of FHT16 (182) is data16, which represents a single modulation symbol on an high speed physical data shared channel (HS-PDSCH) channel. The "dot-cross" operation is typically performed on such data in order to cancel random phase variations introduced by the channel.

FIGS. 15-22 are various exemplary block diagrams illustrating architecture that may be used to implement the "dot-cross" operation. Again, such dot-cross operations are used on the data during equalization in order to cancel random phase variations introduced by the channel. Some or all of the architecture depicted in FIGS. 15-22 may form part of equalizer 60 of FIG. 3.

Figure 15:
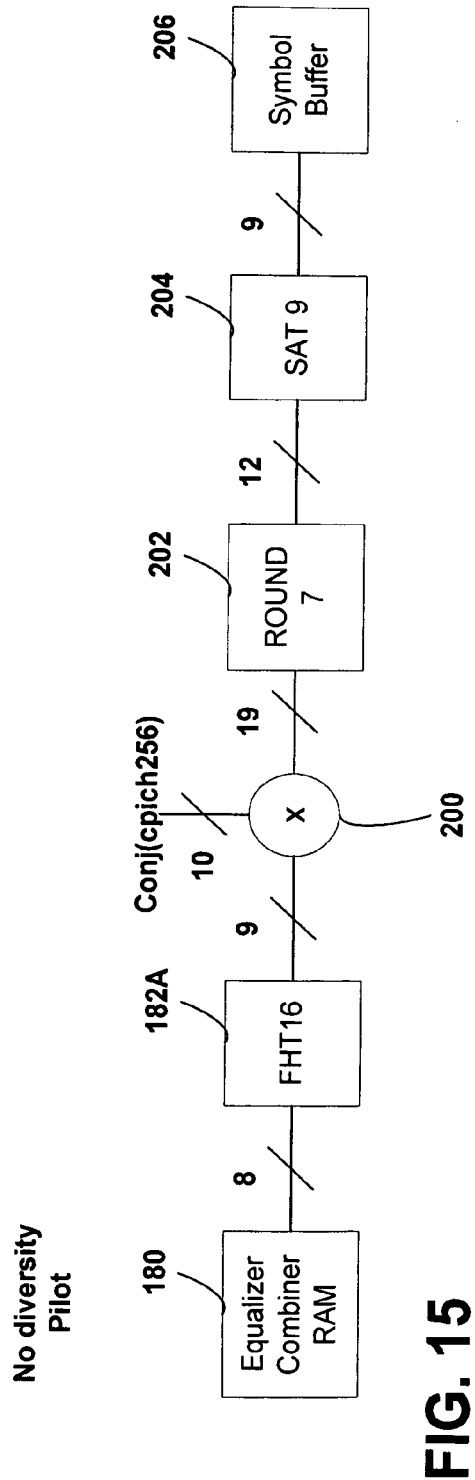
FIGS. 15-22 are various exemplary block diagrams illustrating architecture that may be used to implement the "dot-cross" operation in an equalizer.

FIG. 15 is an exemplary block diagram illustrating architecture that may be used to implement the "dot-cross" operation when no diversity pilot is present on the channel. As shown in FIG. 15, equalizer combiner RAM 180 provides input to FHT16 (182), which performs the extraction of data bits, e.g., as explained above with respect to FIG. 14.

The output of FHT16 (182) is provided to multiplier 200, which multiplies the output of FHT16 (182) by the conjugate of cpich256. The output of multiplier 200 is rounded to remove 7-bits by rounding unit 202 and saturated to 9-bits by saturation unit 204. The output of saturation unit 204 is a symbol for no diversity, which is stored in symbol buffer 206. Any symbols stored in symbol buffer 206 can be forwarded to a back end (such as back end 61 as shown in FIG. 3) for de-interleaving, de-rate matching and decoding.

Figure 16:
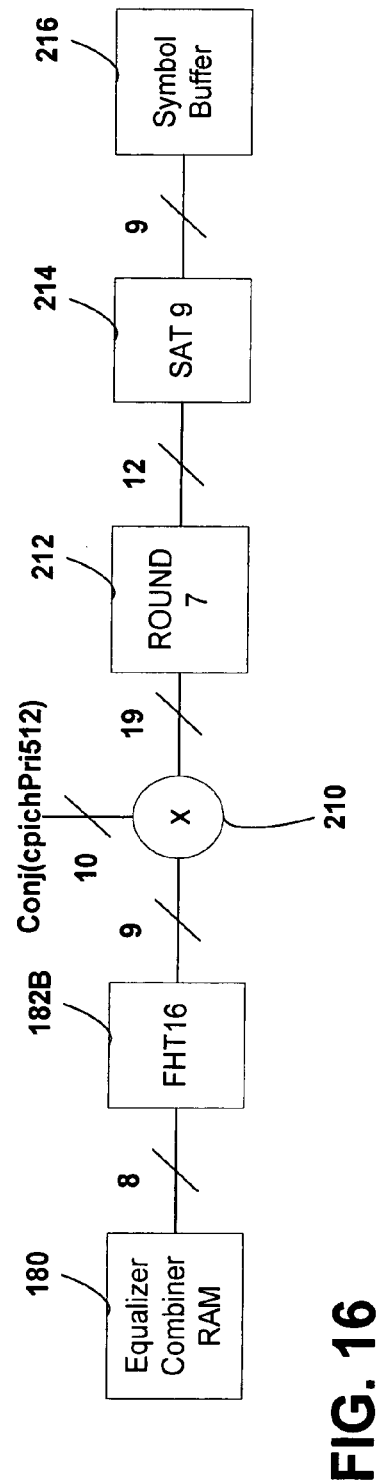

FIG. 16 is an exemplary block diagram illustrating architecture that may be used to implement the "dot-cross" operation when the diversity pilot is present but there is no space time transmit diversity (STTD) or closed loop transmit diversity (CLTD) for UE. FIG. 16 is very similar to FIG. 15, and in some embodiments, the same components may be used to perform the multiplication, rounding, saturation and symbol buffering. These components, however, are labeled differently in FIGS. 15 and 16.

As shown in FIG. 16, equalizer combiner RAM 180 provides input to FHT16 (182), which performs the extraction of data bits, e.g., as explained above with respect to FIG. 14. The output of FHT16 (182) is provided to multiplier 210, which multiplies the output of FHT16 (182) by the conjugate of cpichPri512. The output of multiplier 210 is rounded to remove 7-bits by rounding unit 212 and saturated to 9-bits by saturation unit 214. The output of saturation unit 214 is stored in symbol buffer 216 as the symbol for the case when the diversity pilot is present but there is no space time transmit diversity (STTD) or closed loop transmit diversity (CLTD)

for UE. Any symbols stored in symbol buffer 216 can be forwarded to a back end (such as back end 61 as shown in FIG. 3) for de-interleaving, de-rate matching and decoding.

Figure 17:
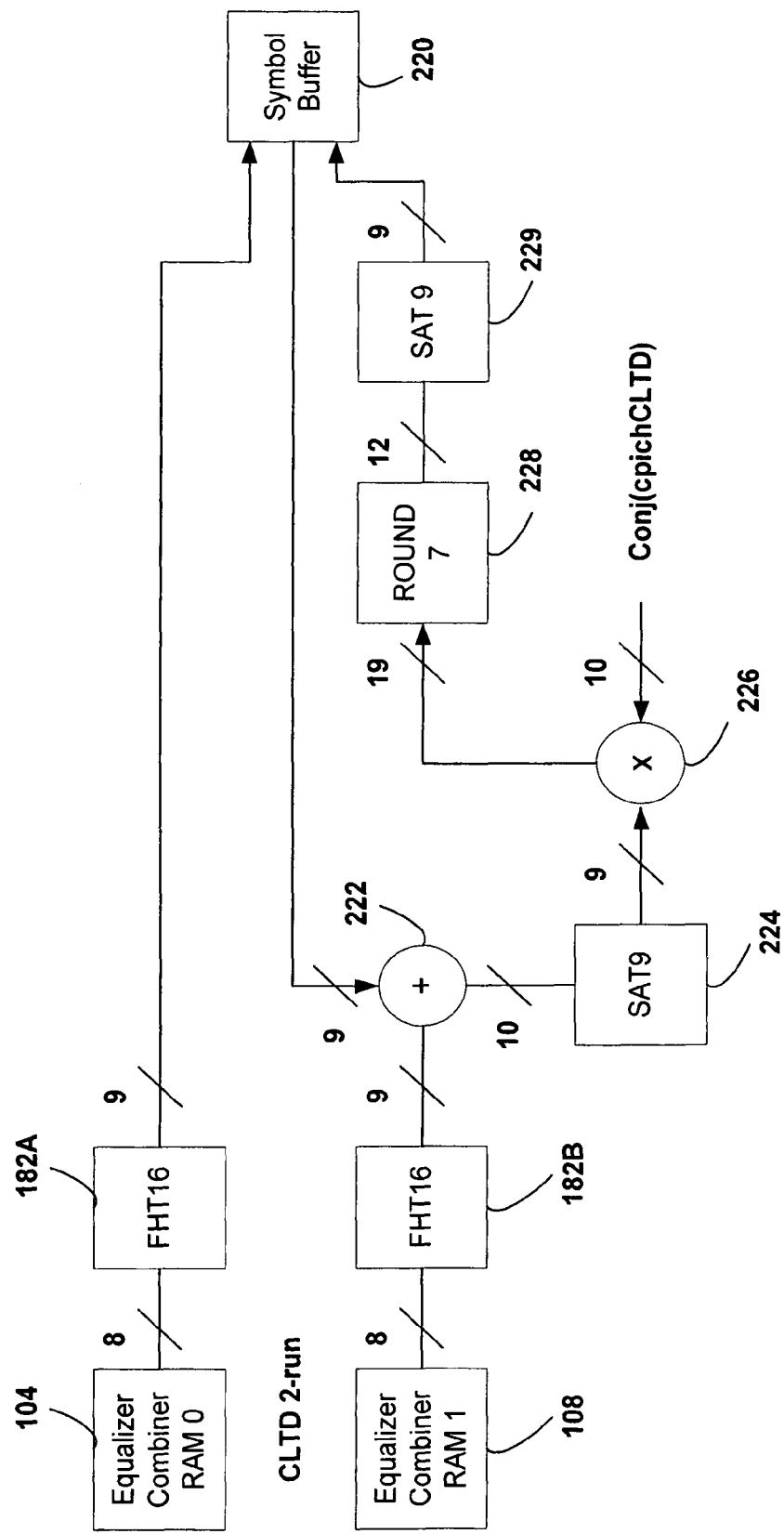

FIG. 17 is an exemplary block diagram illustrating architecture that may be used to implement the "dot-cross" operation for 2-run closed loop transmit diversity (CLTD). As shown in FIG. 16, equalizer combiner RAM 0 (104) and equalizer combiner RAM 1 (108) each provide input to FHT16 (182) at different times, or the architecture may duplicate FHT16 (as illustrated 182A and 182B) for simultaneous generation of the data from both RAM inputs. The output of FHT16 (182A) for the input from equalizer combiner RAM 0 (104) is initially stored in symbol buffer 220. The output of FHT16 (182B) for the input from equalizer combiner RAM 0 (108) is then added to this temporary content of symbol buffer 220 by adder 222 and saturated to 9-bits by saturation unit 224.

Multiplier 226 multiples the output of saturation unit 224 by the conjugate of cpichCLTD. The output of multiplier 226 is rounded by rounding unit 228 to remove 7-bit and saturated to 9-bits by saturation unit 229. The output of saturation unit 229 is then stored in symbol buffer 220 as the symbol for 2-run closed loop transmit diversity (CLTD). It can be noted that the output of FHT16 (182A) for the input from equalizer combiner RAM 0 (104) is replaced by the output of unit 229 in symbol buffer 220. Any symbols stored in symbol buffer 220, then, can be forwarded to a back end (such as back end 61 as shown in FIG. 3) for de-interleaving, de-rate matching and decoding.

Figure 18:
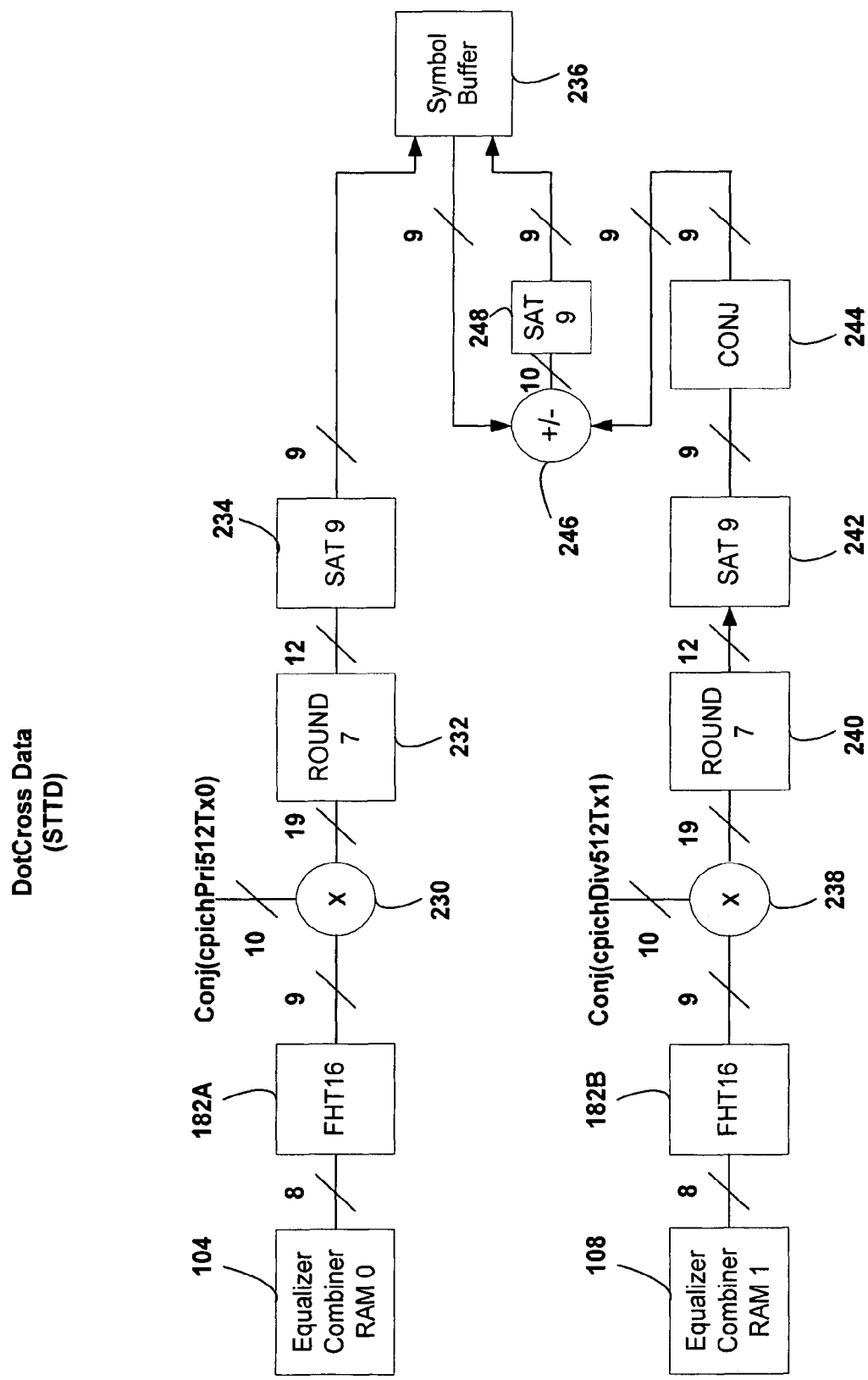

FIG. 18 is an exemplary block diagram illustrating architecture that may be used to implement the "dot-cross" operation for space time transmit diversity (STTD). As shown in FIG. 18, equalizer combiner RAM 0 (104) and equalizer combiner RAM 1 (108) each provide input to FHT16 (182A) and FHT16 (182B), respectively, FHT16 (182A) and FHT16 (182B) may be the same components that process the different data sequentially, or duplicate versions of FHT16 (182) as illustrated in FIG. 14.

The output of FHT16 (182A) is fed to multiplier 230, which multiplies the output of FHT16 (182A) by the conjugate of cpichPri512Tx0. The output of multiplier 230 is rounded by rounding unit 232 to remove 7-bits and saturated to 9-bits by saturation unit 234. The output of saturation unit 234 is initially stored in symbol buffer 220.

The output of FHT16 (182B) is fed to multiplier 238, which multiplies the output of FHT16 (182A) by the conjugate of cpichDiv512Tx1. The output of multiplier 238 is rounded by rounding unit 240 to remove 7-bits and saturated to 9-bits by saturation unit 242. Conjugation (Conj) unit 244 generates the conjugate of the output of saturation unit 242, which generally involves negating the imaginary part of a complex number. The initially stored data in symbol buffer 236 (from saturation unit 234) is then combined with the output of conj unit 244 by adder/subtractor 246. The output of adder/subtractor 246 is then saturated to 9-bits by saturation unit 248 before being stored in symbol buffer 236 as the symbol for space time transmit diversity. The function of adder/subtractor 246 (i.e., addition or subtraction) is based on the real or imaginary nature of the input. Real components are subtracted, whereas imaginary components are added. This amounts to the architecture of FIG. 18 defining complex multiplication. In any case, any symbols in symbol buffer 236, then can be forwarded to a back end (such as back end 61 as shown in FIG. 3) for de-interleaving, de-rate matching and decoding.

Figure 19:
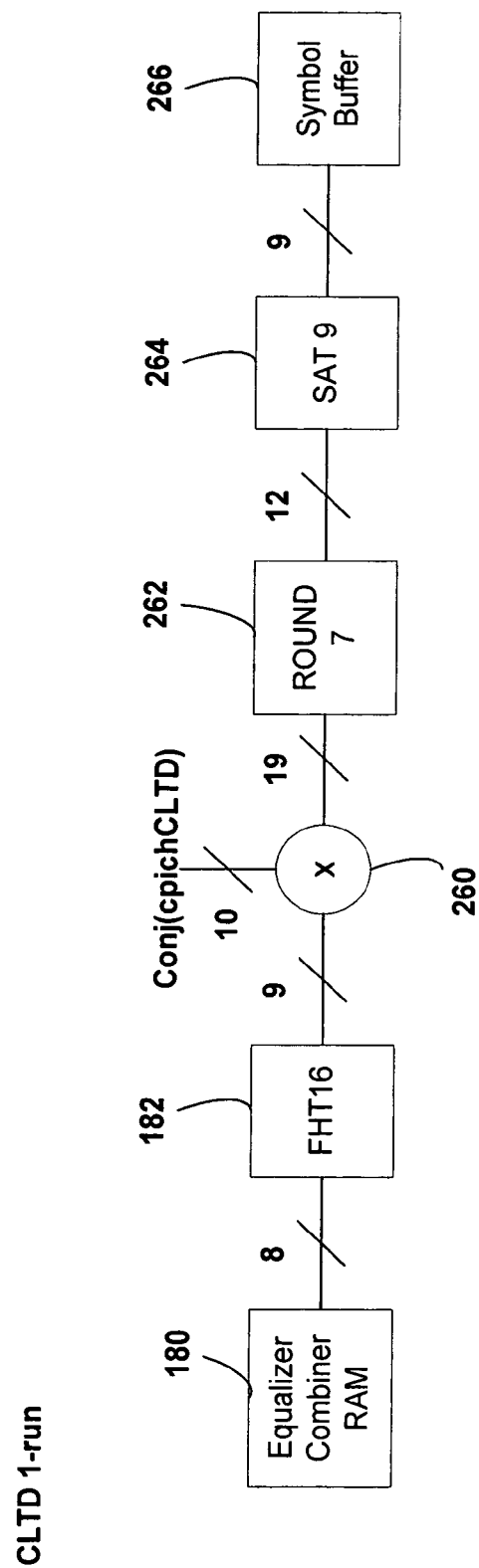

FIG. 19 is an exemplary block diagram illustrating architecture that may be used to implement the "dot-cross" operation for 1-run closed loop transmit diversity (CLTD). As shown in FIG. 19, equalizer combiner RAM 180 provides input to FHT16 (182) which performs the extraction of data bits, e.g., as explained above with respect to FIG. 14.

The output of FHT16 (182) is provided to multiplier 260, which multiplies the output of FHT16 (182) by the conjugate of cpichCLTD. The output of multiplier 260 is rounded to remove 7-bits by rounding unit 262 and saturated to 9-bits by saturation unit 264. The output of saturation unit 264 is a symbol for 1-run closed loop transmit diversity and is stored in symbol buffer 266. The symbols that get stored in symbol buffer 266 can be forwarded to a back end (such as back end 61 as shown in FIG. 3) for de-interleaving, de-rate matching and decoding.

Figure 20:
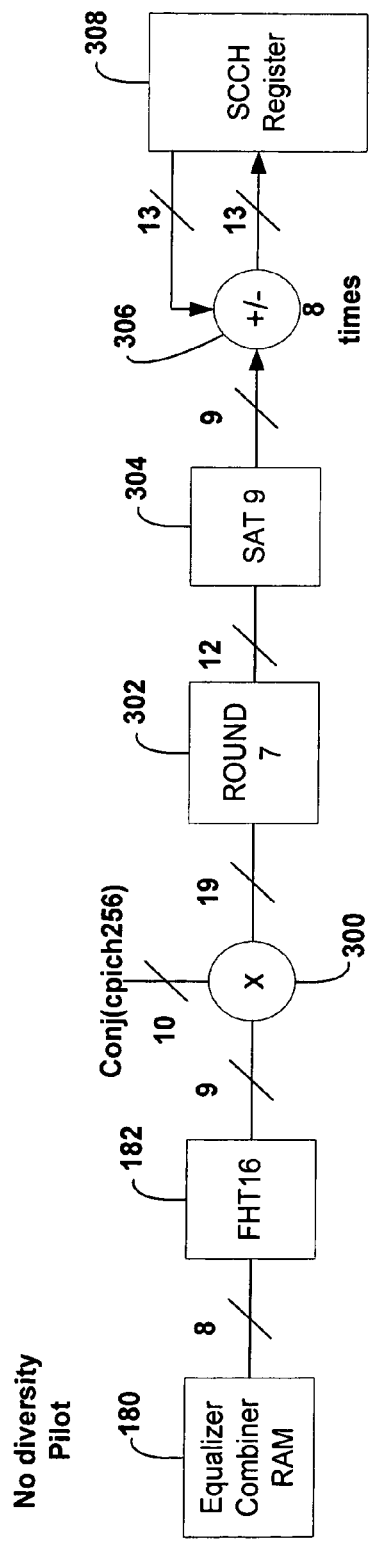
Figure 21:
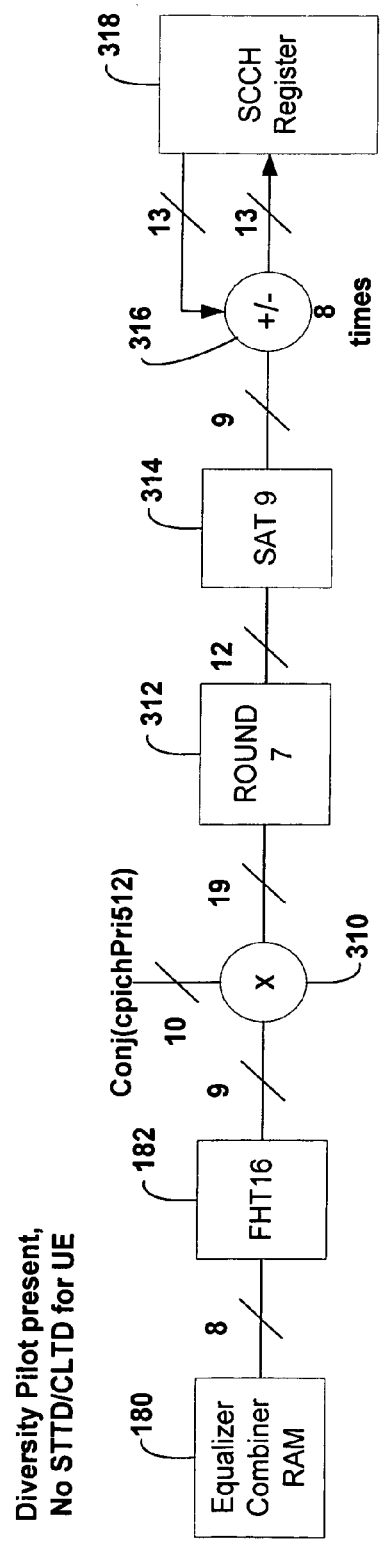
Figure 22:
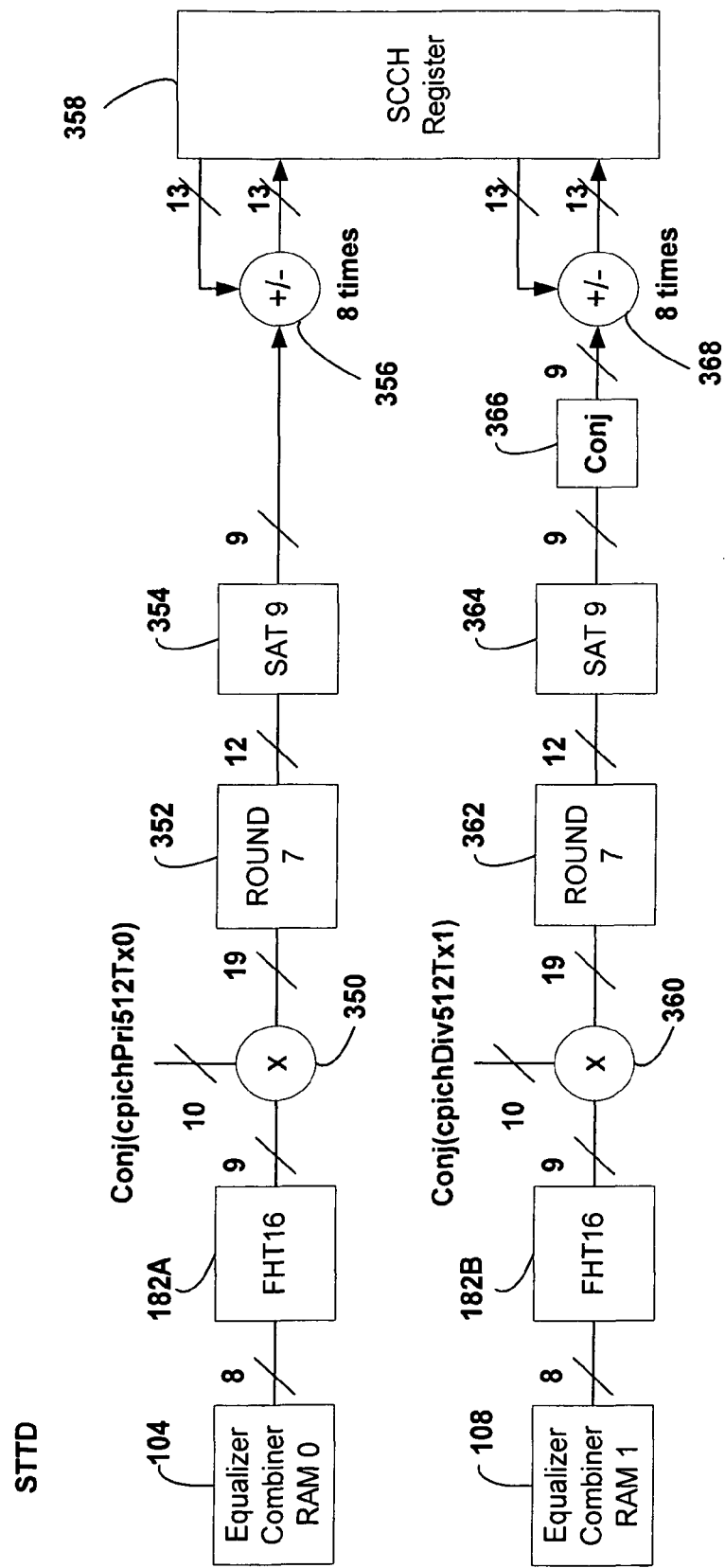

FIGS. 20-22 are additional block diagrams illustrating equalizer architecture that may be used to implement the "dot-cross" operation on the data in order to cancel random phase variations introduced by the channel. The SCCH registers illustrated in FIGS. 20-22 are generally memory used to store symbols for the shared control channel. 8-time sampling occurs to allow the SCCH to use a spreading factor of 128 chips with an implementation that breaks the SCCH generation into 8 separate blocks having 16 bits per block. Each block is processed using an FHT16 and the result is either added or subtracted together. In this case, the addition or subtraction depends on the HS-SCCH OFSF code numbers for a given symbol. In general, the terms SCCH and HS-SCCH are used synonymously in this disclosure.

FIG. 20 is a block diagram illustrating equalizer architecture that relates to a scenario where no diversity pilot is present. As shown in FIG. 20, equalizer combiner RAM 180 provides input to FHT16 (182), which performs the extraction of data bits, e.g., as explained above with respect to FIG. 14. The output of FHT16 (182) is provided to multiplier 300, which multiplies the output of FHT16 (182) by the conjugate of cpich256. The output of multiplier 300 is rounded to remove 7-bits by rounding unit 302 and saturated to 9-bits by saturation unit 304. The output of saturation unit 304 is accumulated for 8-cyclees using adder/subtractor 306, wherein the addition or subtraction depends on the HS-SCCH OFSF code numbers for a given symbol. The final result of this accumulation comprises an HS-SCCH shared control channel symbol and is stored in shared control channel (SCCH) register 308 for the scenario where no diversity pilot is present. Any symbols stored in SCCH register 308 can be forwarded to a back end (such as back end 61 as shown in FIG. 3) for de-interleaving, de-rate matching and decoding.

FIG. 21 is a block diagram illustrating architecture that relates to a scenario where a diversity pilot is present but there is no space time transmit diversity (STTD) or closed loop transmit diversity (CLTD) for UE. As shown in FIG. 21, equalizer combiner RAM 180 provides input to FHT16 (182), which performs the extraction of data bits, e.g., as explained above with respect to FIG. 14. The output of FHT16 (182) is provided to multiplier 310, which multiplies the output of FHT16 (182) by the conjugate of cpichPri512. The output of multiplier 310 is rounded to remove 7-bits by rounding unit 312 and saturated to 9-bits by saturation unit 314. The output of saturation unit 314 is accumulated for 8-cyclees using adder/subtractor 316, wherein the addition or subtraction depends on the HS-SCCH OFSF code numbers for a given symbol. The final result of this accumulation comprises an HS-SCCH shared control channel symbol and is stored in shared control channel (SCCH) register 318 for the scenario where a diversity pilot is present but there is no space time transmit diversity (STTD) or closed loop transmit diversity (CLTD) for UE. The control symbols stored in SCCH register 318 can be forwarded to a back end (such as back end 61 as shown in FIG. 3) for de-interleaving, de-rate matching and decoding.

FIG. 22 is a block diagram illustrating architecture that relates to a scenario of space time transmit diversity (STTD). As shown in FIG. 22, equalizer combiner RAM 0 (104) provides input to FHT16 (182A), which performs the extraction of data bits, e.g., as explained above with respect to FTH16 (182) of FIG. 14. The output of FHT16 (182A) is provided to multiplier 350, which multiplies the output of FHT16 (182A) by the conjugate of cpichPri512Tx0. The output of multiplier 350 is rounded to remove 7-bits by rounding unit 352 and saturated to 9-bits by saturation unit 354. The output of saturation unit 354 is accumulated for 8-cyclees using adder/subtractor 356 wherein the addition or subtraction depends on the HS-SCCH OFSF code numbers for a given symbol. The final result of this accumulation comprises an HS-SCCH shared control channel symbol for transmit antenna 0 and is stored in shared control channel (SCCH) register 358 for the scenario of space time transmit diversity (STTD). Such symbols stored in SCCH register 358 can be forwarded to a back end (such as back end 61 as shown in FIG. 3) for de-interleaving, de-rate matching and decoding.

In addition, for transmit antenna 1, equalizer combiner RAM 1 (108) provides input to FHT16 (182B), which performs the extraction of data bits. The output of FHT16 (182B) is provided to multiplier 362, which multiplies the output of FHT16 (182B) by the conjugate of cpichDiv512Txt. The output of multiplier 362 is rounded to remove 7-bits by rounding unit 364 and saturated to 9-bits by saturation unit 366. Conj unit 368 generates the conjugate of the output of saturation unit 366, which generally involves negating the imaginary part of a complex number. The output of conj unit 368 is accumulated for 8-cyclees using adder/subtractor 369, wherein the addition or subtraction depends on the HS-SCCH OFSF code numbers for a given symbol. The final result of this accumulation comprises the HS-SCCH control symbol for transmit antenna 1 and is stored in shared control channel (SCCH) register 360 for the scenario of space time transmit diversity (STTD).

Figure 23:
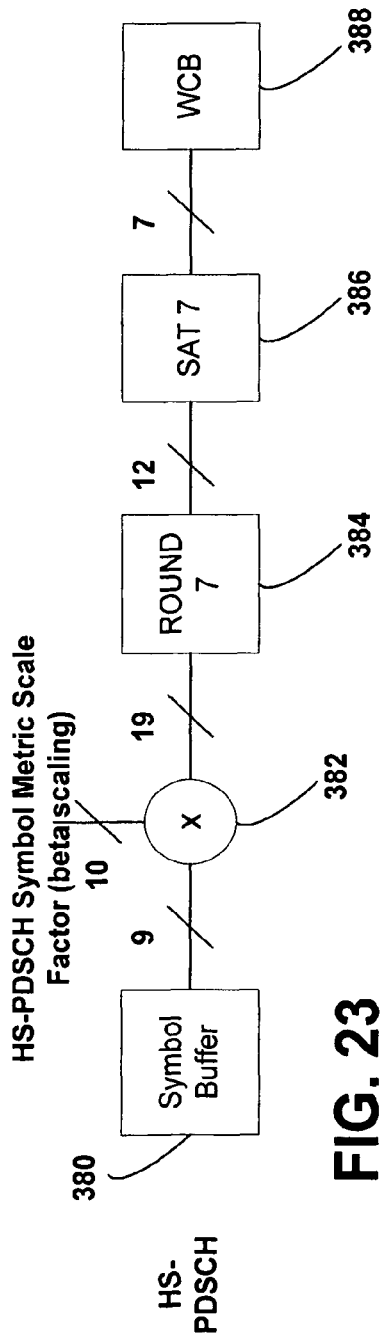
FIG. 23 is block illustrating architecture for generating a symbol for a high speed physical data shared channel (HS-PDSCH) in an equalizer.

FIG. 23 is block illustrating architecture for a high speed physical data shared channel (HS-PDSCH) that may form part of equalizer 60 of FIG. 3. In FIG. 23, symbol buffer 380 may correspond to any of the symbol buffers discussed above for the different diversity scenarios. As shown, the content of symbol buffer 380 is multiplied by an HS-PDSCH symbol metric scale factor using multiplier 382. The HS-PDSCH symbol metric scale factor is a scale factor for scaling the HS-PDSCH symbol and is generally an unsigned quantity. The output of multiplier 382 is rounded to remove 7-bits by rounding unit 384 and saturated to 9-bits by saturation unit 386. The output of saturation unit 354 comprises a demodulation symbol that stored in write control buffer (WCB) 388. The demodulation symbols stored in WBC 388 can be forwarded to a back end (such as back end 61 as shown in FIG. 3) for de-interleaving, de-rate matching and decoding.

Figure 24:
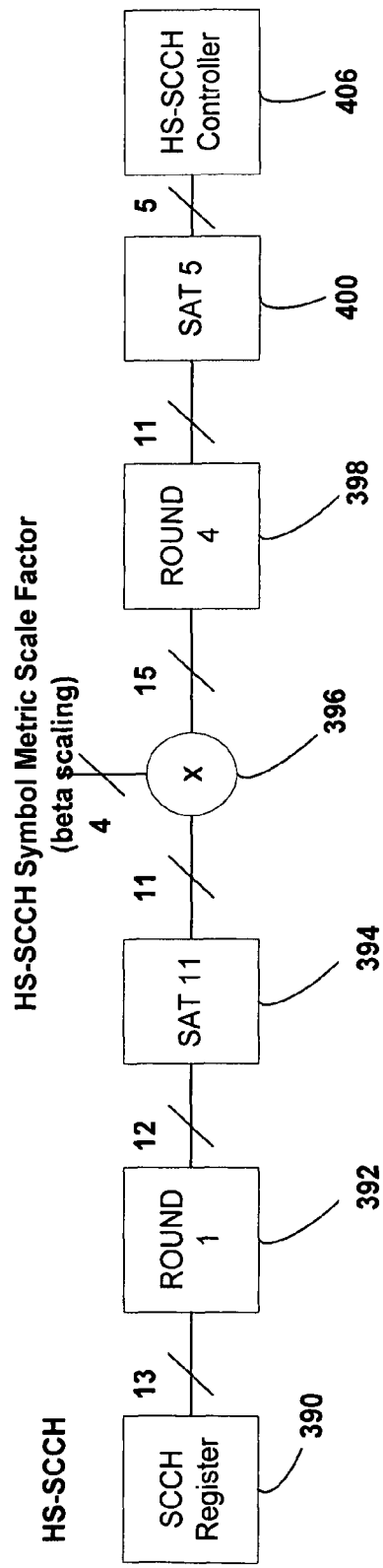
FIG. 24 is block illustrating architecture for generating a symbol for a high speed shared control channel (HS-SCCH) in an equalizer.

FIG. 24 is block illustrating architecture for a high speed shared control channel (HS-SCCH) that may form part of equalizer 60 of FIG. 3. In FIG. 24, SCCH register 390 may correspond to any of the SCCH registers discussed above for the different diversity scenarios. As shown, the content of SCCH register 390 is rounded by 1-bit by rounding unit 392 and saturated to 11-bits by saturation unit 394. Multiplier 396 is used to multiply the output of saturation unit 394 with an HS-SCCH symbol metric scale factor. The HS-SCCH symbol metric scale factor is a scale factor for scaling the HS-SCCH symbol and is generally an unsigned quantity.

The output of multiplier 396 is rounded to remove 4-bits by rounding unit 398 and saturated to 5-bits by saturation unit 400. The output of saturation unit 400 comprises an HS-SCCH symbols, which is provided to HS-SCCH controller 406. HS-SCCH controller 406 is the same as a register in the sense that it is simply a unique memory location for storing HS-SCCH symbols. In any case, the symbols stored in HS-SCCH controller 406 can be forwarded to a back end (such as back end 61 as shown in FIG. 3) for de-interleaving, de-rate matching and decoding.

Figure 25:
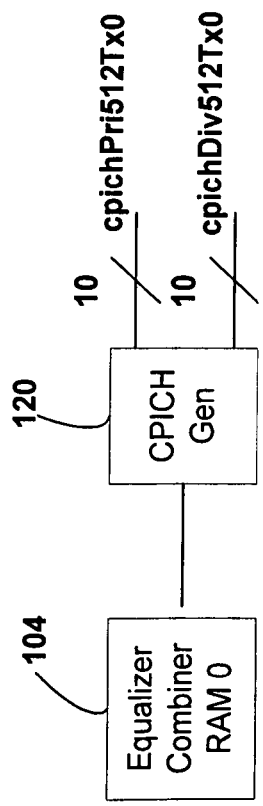
FIG. 25 is a block diagram illustrating the generation of CPICH signals in an equalizer, specifically for both receive diversity and closed-loop transmit diversity (CLTD).

FIG. 25 is a block diagram illustrating the generation of CPICH signals specifically for both receive diversity and closed-loop transmit diversity (CLTD). The architecture of FIG. 25 may form part of equalizer 60 of FIG. 3. In this case, equalizer combiner RAM 0 (104) provides input to CPICH generation unit 120 and CPICH generation unit 120 uses the input to generate cpichPri512Tx0 and cpichDiv512Tx0 for the $0^{th}$ transmit antenna.

Figure 26:
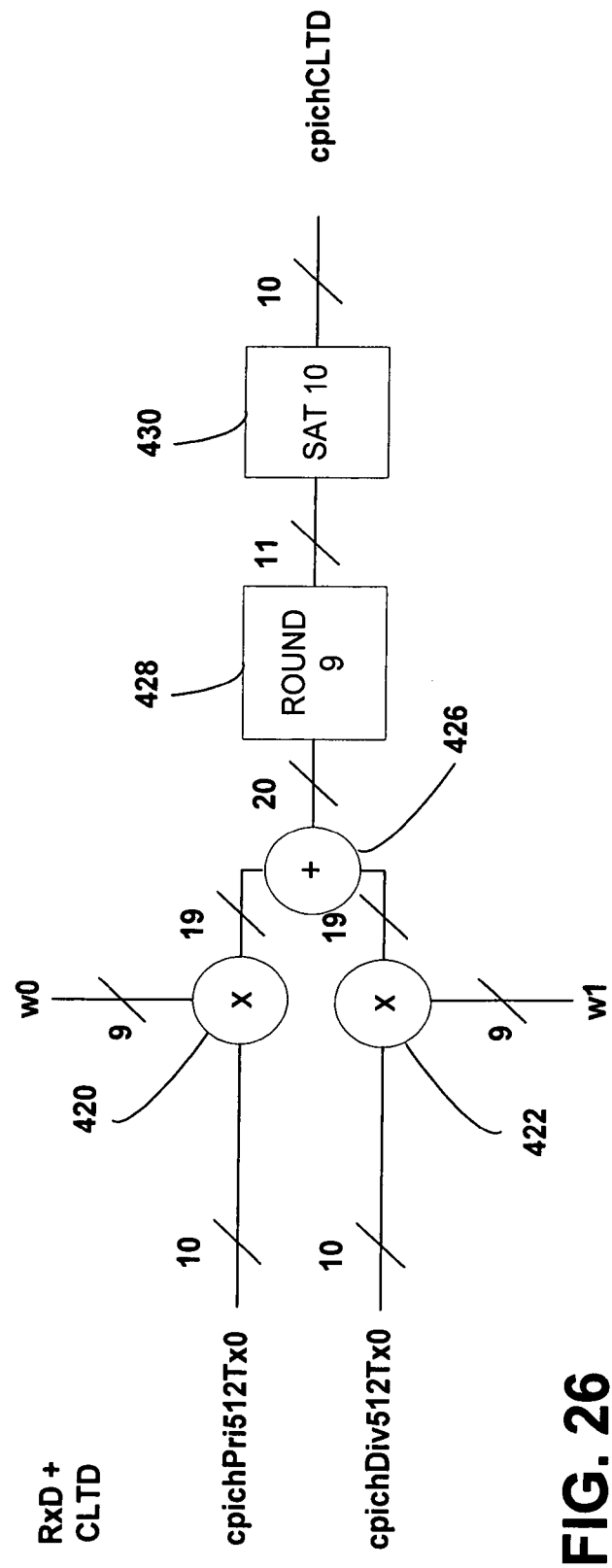
FIG. 26 a block diagram illustrating the generation of cpichCLTD in an equalizer based on the respective CPICH signals generated from the illustration of FIG. 25. The cpich-CLTD is the control signal for closed loop transmit diversity.

FIG. 26 a block diagram illustrating the generation of cpichCLTD, which is the control signal for closed loop transmit diversity, based on the respective CPICH signals generated from the illustration of FIG. 25. The architecture of FIG. 26 may form part of equalizer 60 of FIG. 3. In particular, the input to FIG. 26 is the output of FIG. 25, as labeled. As shown, the cpichPri512Tx0 is multiplied by w0 using multiplier 420. Again, the variable w0 refers to the closed loop transmit diversity weight for transmit antenna 0. In a similar manner, cpichDiv512Tx0 is multiplied by w1 using multiplier 422. The variable w1 refers to the closed loop transmit diversity weight for transmit antenna. The outputs of multipliers 420 and 422 are summed by adder 426, and the output of adder 426 is rounded by rounding unit 428 to remove 9-bit and saturated to 10-bits by saturation unit 430. The output of saturation unit 430 comprises cpichCLTD for the scenario of receive diversity and closed loop transmit diversity (CLTD).

Figure 27:
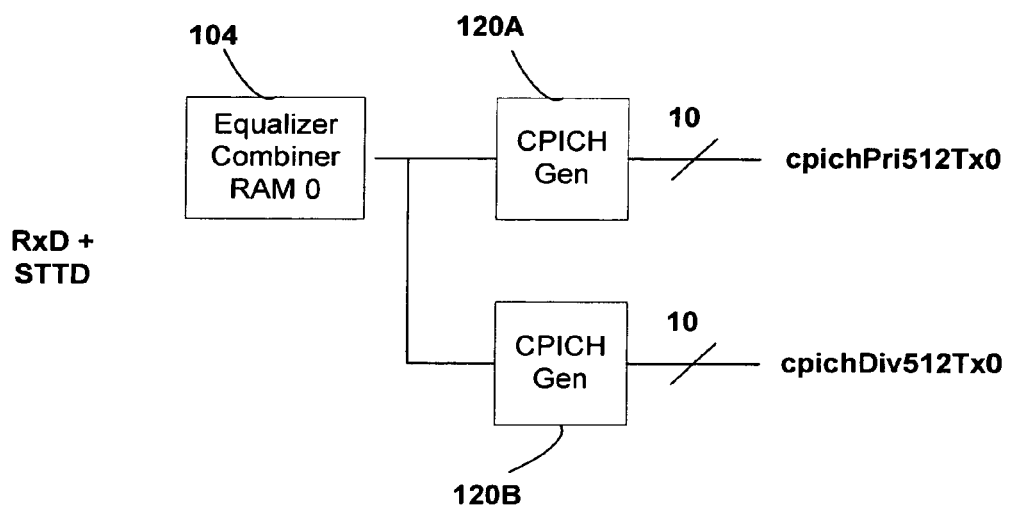
FIG. 27 is a block diagram illustrating the generation of CPICH signals in an equalizer specifically for both receive diversity and space time transmit diversity (STTD).

FIG. 27 is a block diagram illustrating the generation of CPICH signals specifically for both receive diversity and space time transmit diversity (STTD). The architecture of FIG. 27 may form part of equalizer 60 of FIG. 3. In this case, equalizer combiner RAM 0 (104) provides input to CPICH generation unit 120A and CPICH generation unit 120B. CPICH generation units 120A and 120B generally conform to CPICH generation unit 120 (FIG. 7) and may comprise the same unit used in succession or may comprise duplicate units. In either case, CPICH generation units 120A and 120B use the input to generate cpichPri512Tx0 and cpichDiv512Tx0 for the $0^{th}$ transmit antenna.

Figure 28:
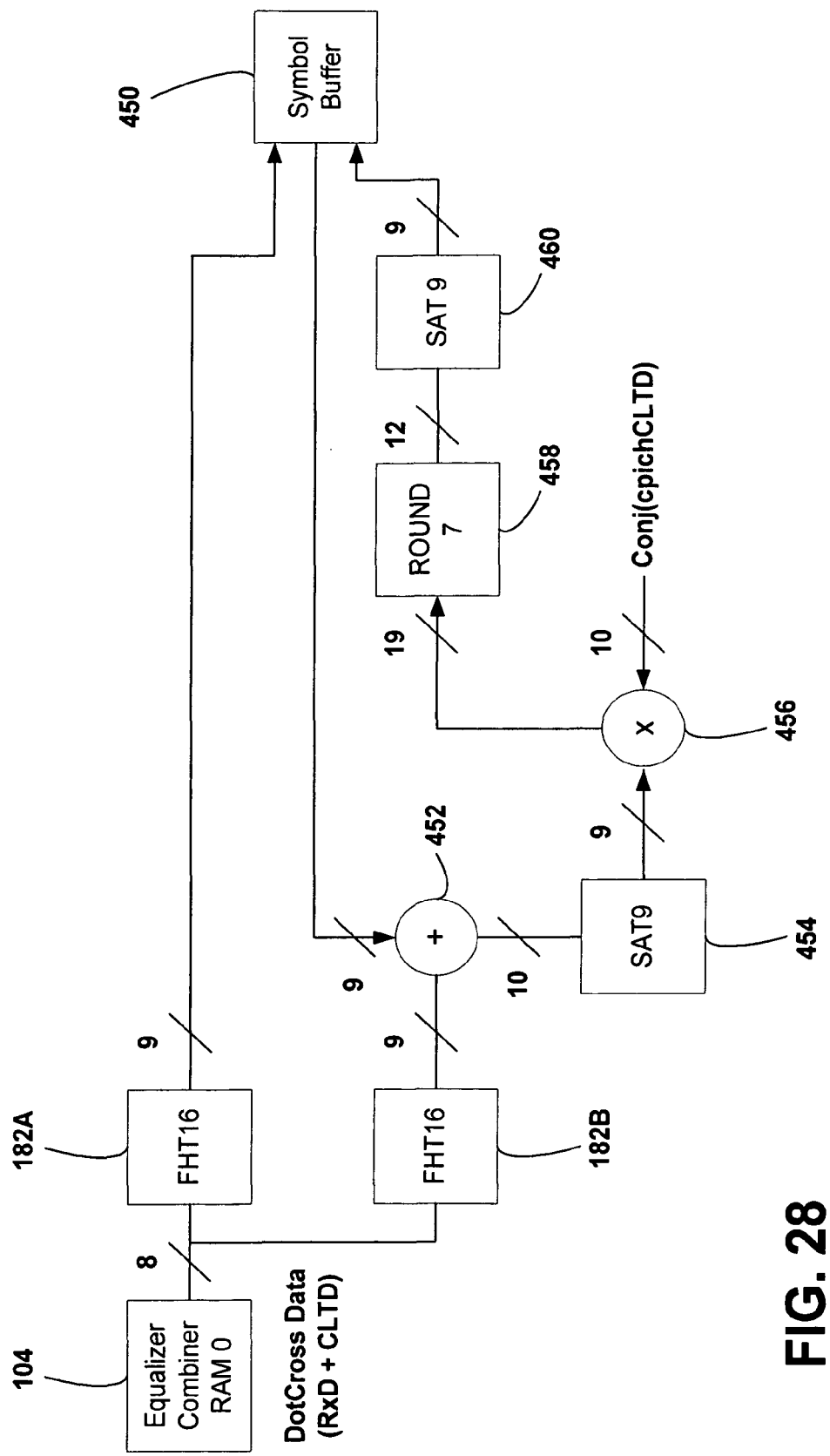
FIG. 28 is an exemplary block diagram illustrating architecture that may be used to implement the "dot-cross" operation in an equalizer for receive diversity (RxD) and closed loop transmit diversity (CLTD).

FIG. 28 is an exemplary block diagram illustrating architecture that may be used to implement the "dot-cross" operation for receive diversity (RxD) and closed loop transmit diversity (CLTD). The architecture of FIG. 28 may form part of equalizer 60 of FIG. 3. As shown in FIG. 28, equalizer combiner RAM 0 (104) provides input to FHT16 (182A) and FHT16 (182B). FHT16 (182A) and FHT16 (182B) may be the same components that process the data sequentially, or duplicate versions of FHT16 (182) as illustrated in FIG. 14. The output of FHT16 (182A) is loaded into symbol buffer 450. The output of FHT16 (182B) is summed with the output of FHT16 (182A) in symbol buffer 450 using adder 452. The output of adder 452 is then saturated to 9-bits using saturation unit 454. Multiplier 456 multiplies the output of saturation unit 454 by the conjugate of cpichCLTD. The output of multiplier 456 is rounded by rounding unit 458 to remove 7-bit and then saturated to 9-bits using saturation unit 460. The output of saturation unit is stored in symbol buffer 450 as the symbol for a scenario of receive diversity and closed loop transmit diversity. Such symbols stored in symbol buffer 450 can be forwarded to a back end (such as back end 61 as shown in FIG. 3) for de-interleaving, de-rate matching and decoding.

Figure 29:
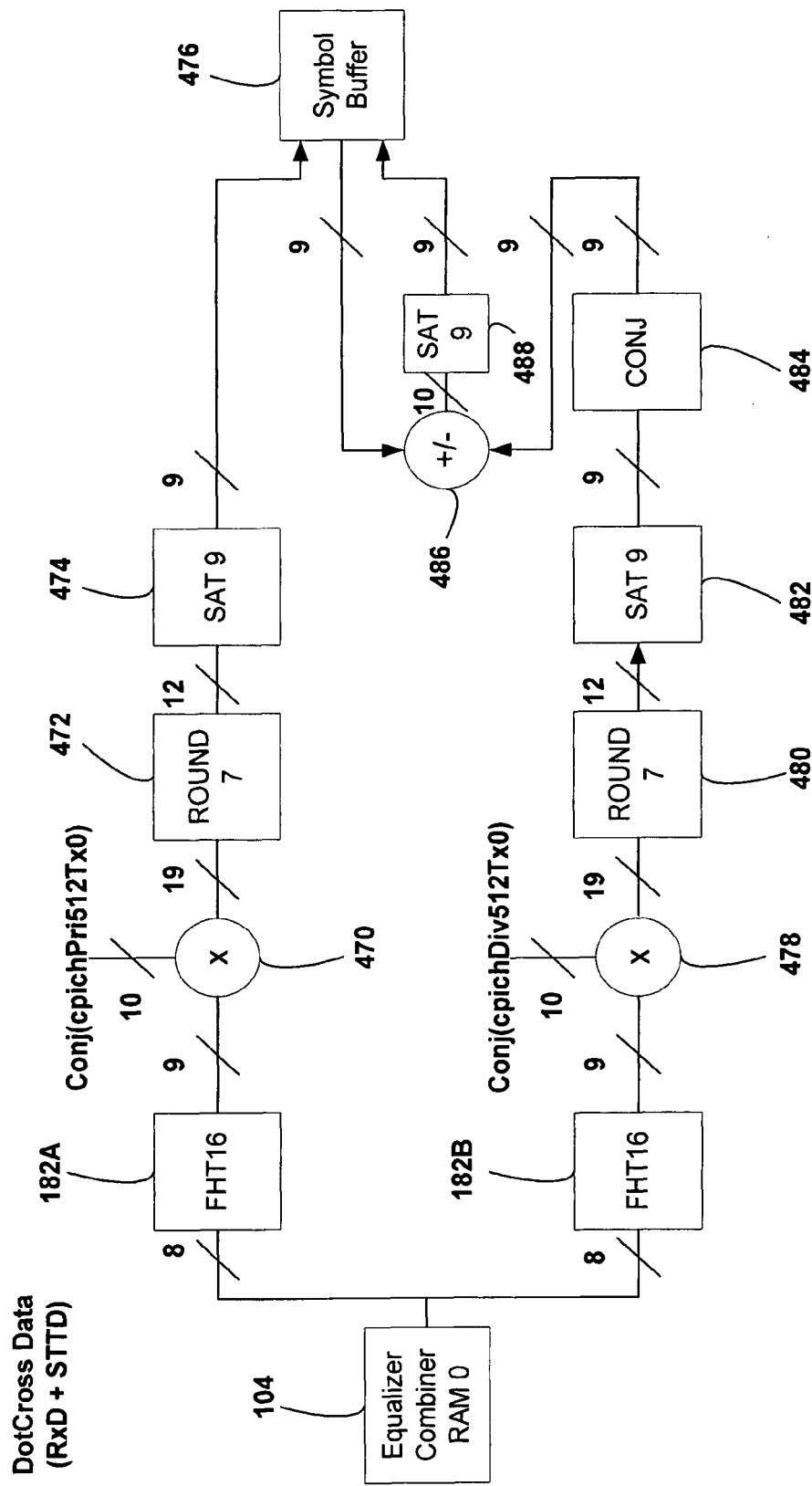
FIG. 29 is an exemplary block diagram illustrating architecture that may be used to implement the "dot-cross" operation in an equalizer for receive diversity (RxD) and space time transmit diversity (STTD).

FIG. 29 is an exemplary block diagram illustrating architecture that may be used to implement the "dot-cross" operation for receive diversity (RxD) and space time transmit diversity (STTD). The architecture of FIG. 29 may form part of equalizer 60 of FIG. 3. As shown in FIG. 29, equalizer combiner RAM 0 (104) provides input to FHT16 (182A) and FHT16 (182B). Again, FHT16 (182A) and FHT16 (182B) may be the same components that process the data sequentially, or duplicate versions of FHT16 (182) as illustrated in FIG. 14.

Multiplier 470 multiplies the output of FHT16 (182A) by the conjugate of cpichPri512Tx0. The output of multiplier 470 is rounded by rounding unit 472 to remove 7-bits and saturated to 9-bits by saturation unit 474. The output of saturation unit 474 is initially stored in symbol buffer 476.

The output of FHT16 (182B) is fed to multiplier 478, which multiplies the output of FHT16 (182A) by the conjugate of cpichDiv512Tx0. The output of multiplier 478 is rounded by rounding unit 480 to remove 7-bits and saturated to 9-bits by saturation unit 482. Conj unit 484 generates the conjugate of the output of saturation unit 482, which generally involves negating the imaginary part of a complex number. The initially stored data in symbol buffer 476 (from saturation unit 474) is then combined with the output of conj unit 484 by adder/subtractor 486. The output of adder/subtractor 246 is then saturated to 9-bits by saturation unit 488 before being stored in symbol buffer 476 as the symbol for the scenario of receive diversity and space time transmit diversity. The function of adder/subtractor 488 (i.e., addition or subtraction) is based on the real or imaginary nature of the input. Real components are subtracted, whereas imaginary components are added. This amounts to the architecture of FIG. 29 defining complex multiplication. The symbols stored in symbol buffer 476 can be forwarded to a back end (such as back end 61 as shown in FIG. 3) for de-interleaving, de-rate matching and decoding.

A number of equalization techniques have been described. The described equalization techniques utilize a fractionally spaced equalizer architecture capable of handing different antenna diversity scenarios. The described equalizer may be implemented hardware, software, firmware, or any combinations thereof. If the equalizer is implemented in software, the processor that executes the software may take the form of a microprocessor or digital signal processor (DSP) and can be integrated with or form part of a wireless communication device or a base station. Memory can store the software and may take the form of random access memory (RAM) storing program code that is accessed and executed by a processor to carry out the various techniques described above.

Exemplary hardware implementations may include implementations within a DSP, an application specific integrated circuit (ASIC), a field programmable gate array (FPGA), a programmable logic device, specifically designed hardware components, or any combination thereof.

Nevertheless, various other modifications may be made without departing from the spirit and scope of the invention. For example, other types of components could be used to implement the techniques described herein. In addition, although exemplary bit lengths have been given for the various examples described above, other bit lengths could be used for other implementations. Accordingly, these and other embodiments are within the scope of the following claims.

The invention claimed is:

1. A method of equalization in a spread spectrum wireless communication system comprising:
   estimating a channel impulse response;
   estimating channel variance by computing a covariance sum comprising values for samples received at different times; and
   selecting filter coefficients for an equalizer based on the estimated channel impulse response and the estimated channel variance;
   wherein the equalizer is a fractionally spaced equalizer including one or more equalization filters having filter coefficients spaced a fraction of a chip apart, and wherein said selecting filter coefficients is based on the estimated channel impulse response and the estimated channel variance for a plurality of fractionally spaced chip samples;
   the method further comprising:
     combining the output of one equalization filter in a first manner for no diversity;
     combining the output of two or more equalization filters in a second manner for transmit diversity; and
     combining the output of two or more equalization filters in a third manner for receive diversity.

2. The method of claim 1, wherein the equalizer is a fractionally spaced equalizer having filter taps spaced one-half chip apart.

3. The method of claim 1, further comprising combining the output of two or more equalization filters in a fourth manner for transmit and receive diversity.

4. The method of claim 1, wherein computing the covariance sum comprising values for samples received at different times comprise computing values for odd and even samples.

5. The method of claim 1, further comprising:
   generating an equalizer output; and
   generating a common pilot channel (CPICH) signal based on the equalizer output and antenna diversity.

6. A method of equalization for spread spectrum wireless communication comprising:
   estimating channel variance by computing a covariance sum comprising values for samples received at different times;
   selecting filtering coefficients for an equalizer comprising one or more equalization filters based on an estimated channel impulse response and the estimated channel variance; and
   combining the output of one equalization filter in a first manner for no diversity;
   combining the output of two or more equalization filters in a second manner for transmit diversity; and
   combining the output of two or more equalization filters in a third manner for receive diversity;
   wherein the equalizer is a fractionally spaced equalizer having filtering coefficients spaced a fraction of a chip apart, and wherein said selecting filtering coefficients is based on the estimated channel impulse response and the estimated channel variance for a plurality of fractionally spaced chip samples.

7. The method of claim 6, further comprising combining the output of two or more equalization filters in a fourth manner for transmit and receive diversity.

8. The method of claim 6, further comprising:
   estimating the channel impulse response.

9. The method of claim 8, wherein the equalizer is a fractionally spaced equalizer having filter taps spaced a fraction of a chip apart.

10. A spread spectrum wireless communication device comprising:

a receiver that receives a wireless signal; and
an equalizer that estimates a channel impulse response, estimates channel variance by computing a covariance sum comprising values for samples of the signal received at different times, and selects filter coefficients for the equalizer based on the estimated channel impulse response and the estimated channel variance;
wherein the equalizer is a fractionally spaced equalizer having filter coefficients spaced a fraction of a chip apart, and wherein filter coefficients are selected based on the estimated channel impulse response and the estimated channel variance for a plurality of fractionally spaced chip samples;
wherein the equalizer includes two or more equalization filters and is configured to:
 combine the output of one equalization filter in a first manner for no diversity;
 combine the output of two or more equalization filters in a second manner for transmit diversity in which a sending device that sends the signals to the wireless communication device includes multiple transmit antennas; and
 combine the output of two or more equalization filters in a third manner for receive diversity in which the wireless communication device includes multiple receive antennas.

11. The wireless communication device of claim 10, wherein the equalizer is a fractionally spaced equalizer having filter taps spaced one-half chip apart.

12. The wireless communication device of claim 10, wherein the equalizer is configured to combine the output of two or more equalization filters in a fourth manner for transmit and receive diversity.

13. The wireless communication device of claim 10, wherein the equalizer computes the covariance sum comprising values for samples received at different times by computing values for odd and even samples.

14. An equalizer for a spread spectrum wireless communication device, the equalizer being configured to:
 estimate channel variance by computing a covariance matrix sum comprising values for samples received at different times;
 select filtering coefficients for two or more equalization filters based on an estimated channel impulse response and the estimated channel variance; and
 combine the output of one equalization filter in a first manner for no diversity;
 combine the output of the two or more equalization filters in a second manner for transmit diversity; and
 combine the output of the two or more equalization filters in a third manner for receive diversity;
 wherein the equalizer is a fractionally spaced equalizer having filtering coefficients spaced a fraction of a chip apart, and wherein filtering coefficients are selected based on the estimated channel impulse response and the estimated channel variance for a plurality of fractionally spaced chip samples.

15. The equalizer of claim 14, wherein the equalizer combines the output of the two or more equalization filters in a further manner for transmit and receive diversity.

16. The equalizer of claim 14, wherein the equalizer: estimates the channel impulse response.

17. The equalizer of claim 16, wherein the equalizer is a fractionally spaced equalizer having filter taps spaced one-half chip apart.

18. A memory storage device comprising program code that when executed in a spread spectrum wireless communication device causes the wireless communication device to perform equalization by:
 estimating a channel impulse response;
 estimating channel variance by computing a covariance sum comprising values for samples received at different times;
 selecting filter coefficients for an equalizer based on the estimated channel impulse response and the estimated channel variance;
 combining the output of one equalization filter in the equalizer in a first manner for no diversity;
 combining the output of two or more equalization filters in the equalizer in a second manner for transmit diversity; and
 combining the output of the two or more equalization filters in the equalizer in a third manner for receive diversity;
 wherein the equalizer is a fractionally spaced equalizer having filter taps spaced a fraction of a chip apart, and wherein said selecting filter coefficients is based on the estimated channel impulse response and the estimated channel variance for a plurality of fractionally spaced chip samples.

19. The memory storage device computer readable medium of claim 18, wherein the equalizer is a fractionally spaced equalizer having filter taps spaced one-half chip apart.

20. The memory storage device of claim 18, wherein computing the covariance sum comprising values for samples received at different times comprises computing values for odd and even samples.

21. The memory storage device of claim 18, further comprising program code that when executed causes the device to:
 generate an equalizer output; and
 generating a common pilot channel (CPICH) signal based on the equalizer output and antenna diversity.

22. A memory storage device comprising program code that when executed in a spread spectrum wireless communication device cause the device to perform equalization by:
 estimating channel variance by computing a covariance matrix sum comprising values for samples received at different times;
 selecting filtering coefficients for two or more equalization filters of an equalizer based on an estimated channel impulse response and the estimated channel variance;
 combining the output of one equalization filter in a first manner for no diversity;
 combining the output of the two or more equalization filters in a second manner for transmit diversity; and
 combining the output of the two or more equalization filters in a third manner for receive diversity;
 wherein the equalizer is a fractionally spaced equalizer having filtering coefficients spaced a fraction of a chip apart, and wherein filtering coefficients are selected based on the estimated channel impulse response and the estimated channel variance for a plurality of fractionally spaced chip samples.

23. The memory storage device of claim 22, further comprising program code that when executed in the spread spectrum wireless communication device cause the device to:
 estimate the channel impulse response.

24. The memory storage device of claim 22, wherein the equalizer is a fractionally spaced equalizer having filter taps spaced one-half chip apart.

25. An equalizer for a spread spectrum wireless communication device, the equalizer comprising:

means for estimating channel variance by computing a covariance sum comprising values for samples received at different times;
means for selecting filtering coefficients for two or more equalization filters based on an estimated channel impulse response and the estimated channel variance; and
means for combining the output of one equalization filter in a first manner for no diversity;
means for combining the output of the two or more equalization filters in one manner for transmit diversity; and
means for combining the output of the two or more equalization filters in another manner for receive diversity;
wherein the equalizer is a fractionally spaced equalizer having filter taps spaced a fraction of a chip apart and wherein the means for selecting filtering coefficients selects filtering coefficients based on the estimated channel impulse response and the estimated channel variance for a plurality of fractionally spaced chip samples.

* * * * *